United States Patent [19]
Young et al.

[11] Patent Number: 6,064,959
[45] Date of Patent: *May 16, 2000

[54] ERROR CORRECTION IN SPEECH RECOGNITION

[75] Inventors: Jonathan Hood Young, Newtonville; David Wilsberg Parmenter, Newton; Robert Roth, Newtonville; Joev Dubach, Watertown; Gregory J. Gadbois, Amesbury; Stijn Van Even, Jamaica Plain, all of Mass.

[73] Assignee: Dragon Systems, Inc., Newton, Mass.

[*] Notice: This patent issued on a continued prosecution application filed under 37 CFR 1.53(d), and is subject to the twenty year patent term provisions of 35 U.S.C. 154(a)(2).

[21] Appl. No.: 08/825,534

[22] Filed: Mar. 28, 1997

[51] Int. Cl.$^7$ .............................. G10L 15/22; G10L 15/26
[52] U.S. Cl. ........................................... 704/251; 704/275
[58] Field of Search .............................. 704/10, 231, 243, 704/244, 251, 255, 256, 257, 275, 9

[56] References Cited

U.S. PATENT DOCUMENTS

| | | |
|---|---|---|
| 4,355,302 | 10/1982 | Aldefeld et al. ................. 340/146.3 Q |
| 4,674,065 | 6/1987 | Lange et al. . |
| 4,783,803 | 11/1988 | Baker et al. . |
| 4,805,218 | 2/1989 | Bamberg et al. .......................... 381/43 |
| 4,805,219 | 2/1989 | Baker et al. ............................... 381/43 |
| 4,829,576 | 5/1989 | Porter ......................................... 381/43 |
| 4,833,712 | 5/1989 | Bahl et al. ................................. 381/43 |
| 4,866,778 | 9/1989 | Baker ......................................... 381/43 |
| 4,914,704 | 4/1990 | Cole et al. ................................. 381/43 |
| 4,931,950 | 6/1990 | Isle et al. ................................. 364/513 |
| 4,959,864 | 9/1990 | Van Nes et al. . |
| 5,027,406 | 6/1991 | Roberts et al. ........................... 381/43 |
| 5,031,217 | 7/1991 | Nishimura ................................. 381/43 |
| 5,033,087 | 7/1991 | Bahl et al. ................................. 381/43 |
| 5,036,538 | 7/1991 | Oken et al. ................................. 381/43 |
| 5,170,432 | 12/1992 | Hackbarth et al. . |
| 5,202,952 | 4/1993 | Gillick et al. .............................. 395/2 |
| 5,231,670 | 7/1993 | Goldhor et al. .......................... 381/43 |
| 5,258,909 | 11/1993 | Damerau et al. ........................... 704/9 |
| 5,311,429 | 5/1994 | Tominaga ................................. 704/10 |
| 5,323,310 | 6/1994 | Robinson ................................. 704/10 |
| 5,329,609 | 7/1994 | Sanada et al. . |
| 5,377,303 | 12/1994 | Firman . |
| 5,384,892 | 1/1995 | Strong . |

(List continued on next page.)

FOREIGN PATENT DOCUMENTS

WO94/16434  7/1994  WIPO .

OTHER PUBLICATIONS

Mandel, Mark A. et al., "A Commercial Large–Vocabulary Discrete Speech Recognition System: DragonDictate," Language and Speech, vol. 35 (1, 2) (1992), pp. 237–246.

Bahl, L.R. et al., "Constructing Groups of Acoustically Confusable Words," IEEE (1990), pp. 85–88.

Huang et al., "Spellmode Recognition Based on Vector Quantization," Speech Communication, vol. 7 (1988), Elsevier Science Publishers B.V., North–Holland, pp. 41–53.

Hunnicutt, Sheri, "Reversible Letter–to–Sound Sound–to–Letter Generation", Eurospeech '93, vol. 2, pp. 763–766.

Kaspar et al., "Speech Recognition by Spelling for Large Vocabularies," NTG–Fachberichte, vol. 94 (Apr. 1986), pp. 31–36.

Marx et al., "Reliable Spelling Despite Poor Spoken Letter Recognition," AVIOS '94, Proc. of the 13th Annual Annual International Voice I/O Applications Conference, Silicon Valley/San Jose, CA, Sep. 20–22, 1994.

*Primary Examiner*—David R. Hudspeth
*Assistant Examiner*—Martin Lerner
*Attorney, Agent, or Firm*—Fish & Richardson, PC

[57] ABSTRACT

Incorrect text associated with recognition errors in computer-implemented speech recognition is corrected by performing speech recognition on an utterance to produce a recognition result for the utterance. When a correction command is identified in the recognition result for the utterance, corrected text is produced from a portion of the recognition result for the utterance.

22 Claims, 31 Drawing Sheets

U.S. PATENT DOCUMENTS

| | | | |
|---|---|---|---|
| 5,428,707 | 6/1995 | Gould et al. | |
| 5,497,373 | 3/1996 | Hulen et al. | 370/79 |
| 5,625,748 | 4/1997 | McDonough et al. | 704/251 |
| 5,632,002 | 5/1997 | Hashimoto et al. | |
| 5,677,990 | 10/1997 | Junqua | 704/255 |
| 5,737,723 | 4/1998 | Riley et al. | 704/244 |
| 5,781,887 | 7/1998 | Juang | 704/244 |
| 5,799,273 | 8/1998 | Mitchell et al. | 704/275 |
| 5,799,279 | 8/1998 | Gould et al. | 704/275 |

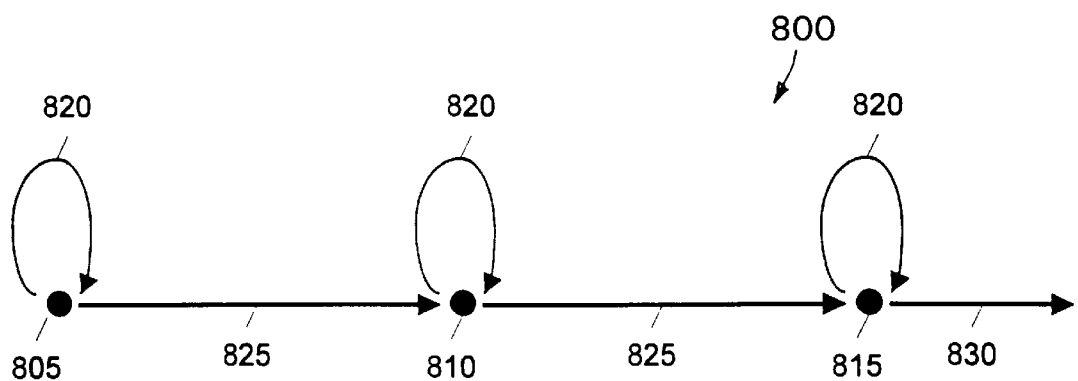
FIG. 8A
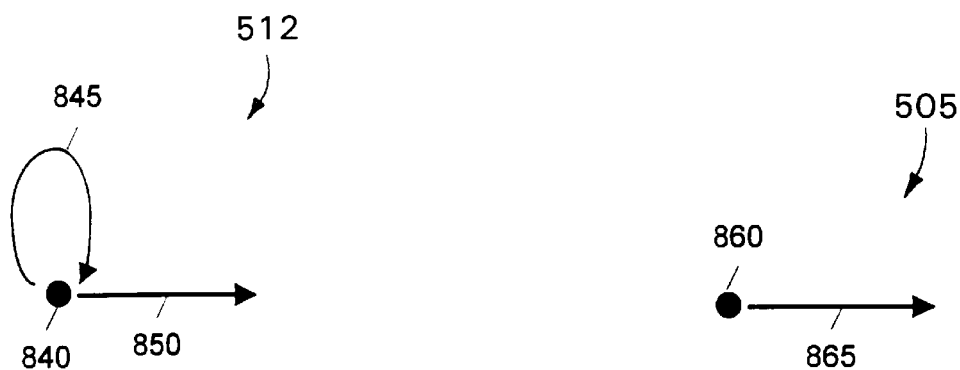
FIG. 8B
FIG. 8C

FIG. 9

| Frame | 840 ("A") | 805 ("B") | 810 ("C") | 815 ("D") | Next Node ("N") |
|---|---|---|---|---|---|
| 0 | 0 | --- | --- | --- | --- |
| 1 | $S_{A1} = A_{A1}$ | $S_{B1} = A_{B1}$ | --- | --- | --- |
| 2 | $S_{A2} = S_{A1} + A_{A2}$ | $S_{B2} = \min(S_{B1}+stay_B, S_{A1}) + A_{B2}$ | $S_{C2} = S_{B1} + leave_B + A_{C2}$ | --- | --- |
| 3 | $S_{A3} = S_{A2} + A_{A3}$ | $S_{B3} = \min(S_{B2}+stay_B, S_{A2}) + A_{B3}$ | $S_{C3} = \min(S_{C2}+stay_C, S_{B2}+leave_B) + A_{C3}$ | $S_{D3} = S_{C2} + leave_C + A_{D3}$ | --- |
| 4 | $S_{A4} = S_{A3} + A_{A4}$ | $S_{B4} = \min(S_{B3}+stay_B, S_{A3}) + A_{B4}$ | $S_{C4} = \min(S_{C3}+stay_C, S_{B3}+leave_B) + A_{C4}$ | $S_{D4} = \min(S_{D3}+stay_D, S_{C3}+leave_C) + A_{D4}$ | $S_{N4} = S_{D2} + leave_D + A_{D4}$ |
| n | $S_{An} = S_{An-1} + A_{An}$ | $S_{Bn} = \min(S_{Bn-1}+stay_B, S_{An-1}) + A_{Bn}$ | $S_{Cn} = \min(S_{Cn-1}+stay_C, S_{Bn-1}+leave_B) + A_{Cn}$ | $S_{Dn} = \min(S_{Dn-1}+stay_D, S_{Cn-1}+leave_C) + A_{Dn}$ | $S_{NN} = \min(S_{Nn-1}+stay_M, S_{Mn-1}+leave_M) + A_{Nn}$ |

| Frame | 810 ("A") | 805 ("B") | 810 ("C") | 815 ("D") | Next Node ("N") |
|---|---|---|---|---|---|
| 0 | $S_{A0}=0$ | --- | --- | --- | --- |
| 1 | $S_{A1} = f(S_{A0}, A_{A1})$ | $S_{B1} = f(S_{A0}, A_{B1})$ | --- | --- | --- |
| 2 | $S_{A2} = f(S_{A1}, A_{A2})$ | $S_{B2} = f(S_{B1}, stay_B, S_{A1}, A_{B2})$ | $S_{C2} = f(S_{B1}, leave_B, A_{C2})$ | --- | --- |
| 3 | $S_{A3} = f(S_{A2}, A_{A3})$ | $S_{B3} = f(S_{B2}, stay_B, S_{A2}, A_{B3})$ | $S_{C3} = f(S_{C2}, stay_C, S_{B2}, leave_B, A_{C3})$ | $S_{D3} = f(S_{C2}, leave_C, A_{D3})$ | --- |
| 4 | $S_{A4} = f(S_{A3}, A_{A4})$ | $S_{B4} = f(S_{B3}, stay_B, S_{A3}, A_{B4})$ | $S_{C4} = f(S_{C3}, stay_C, S_{B3}, leave_B, A_{C4})$ | $S_{D4} = f(S_{D3}, stay_D, S_{C3}, leave_C, A_{D4})$ | $S_{N4} = f(S_{D3}, leave_D, A_{D3})$ |
| n | $S_{An} = f(S_{An-1}, A_{An})$ | $S_{Bn} = f(S_{Bn-1}, stay_B, S_{An-1}, A_{Bn})$ | $S_{Cn} = f(S_{Cn-1}, stay_C, S_{Bn-1}, leave_B, A_{Cn})$ | $S_{Dn} = f(S_{Dn-1}, stay_D, S_{Cn-1}, leave_C, A_{Dn})$ | $S_{Nn} = f(S_{Dn-1}, leave_N, A_{Nn})$ |

FIG. 10 select "Brown" by mouse

Correction those who Brown to meet this those who Brown to meet this
those who Brown's meet this
those who grabs a meet this
those who Browns meet this
those who browns meet this
those who grabs meet this
those who Brown to meet is
those who browns and meet this
those who Brown's meat is
those who Brown's meet is

1600
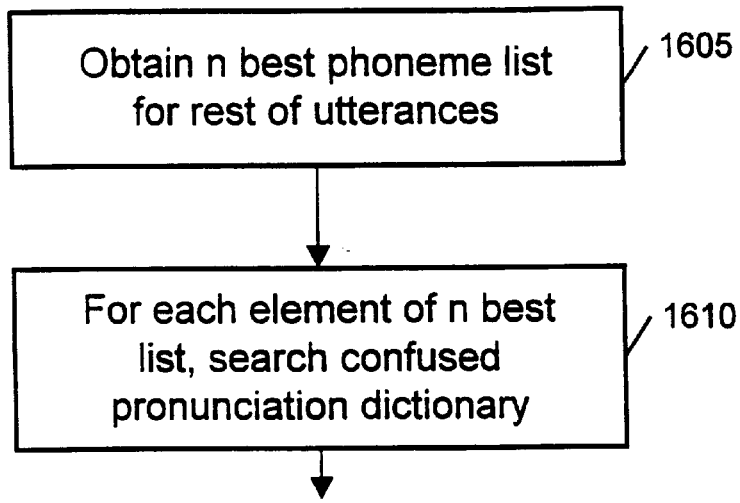
(MAKE THAT)
FIG. 16
1800
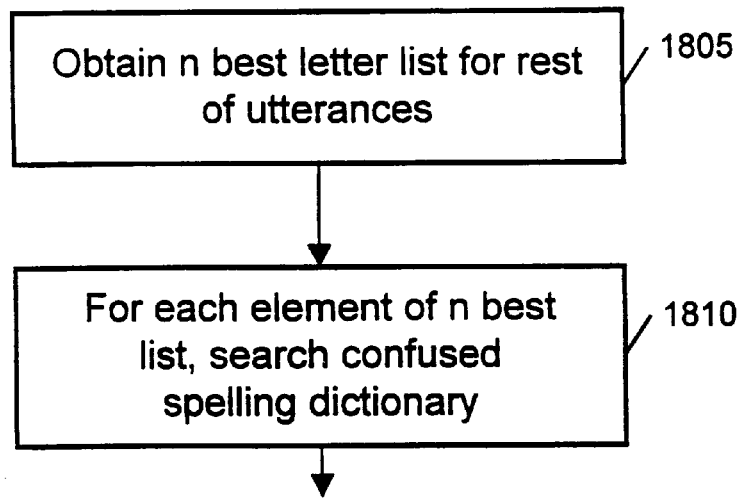
(SPELL THAT)
FIG. 18

(TYPE)

ERROR CORRECTION IN SPEECH RECOGNITION

BACKGROUND

The invention relates to correcting recognition errors in speech recognition.

A speech recognition system analyzes a user's speech to determine what the user said. Most speech recognition systems are frame-based. In a frame-based system, a processor divides a signal descriptive of the speech to be recognized into a series of digital frames, each of which corresponds to a small time increment of the speech.

A speech recognition system may be a "discrete" system that recognizes discrete words or phrases but which requires the user to pause briefly between each discrete word or phrase. Alternatively, a speech recognition system may be a "continuous" system that can recognize spoken words or phrases regardless of whether the user pauses between them. Continuous speech recognition systems typically have a higher incidence of recognition errors in comparison to discrete recognition systems due to complexities of recognizing continuous speech. A more detailed description of continuous speech recognition is provided in U.S. Pat. No. 5,202,952, entitled "LARGE-VOCABULARY CONTINUOUS SPEECH PREFILTERING AND PROCESSING SYSTEM," which is incorporated by reference.

In general, the processor of a continuous speech recognition system analyzes "utterances" of speech. An utterance includes a variable number of frames and corresponds, for example, to a period of speech followed by a pause of at least a predetermined duration.

The processor determines what the user said by finding acoustic models that best match the digital frames of an utterance, and identifying text that corresponds to those acoustic models. An acoustic model may correspond to a word, phrase or command from a vocabulary. An acoustic model also may represent a sound, or phoneme, that corresponds to a portion of a word. Collectively, the constituent phonemes for a word represent the phonetic spelling of the word. Acoustic models also may represent silence and various types of environmental noise.

The words or phrases corresponding to the best matching acoustic models are referred to as recognition candidates. The processor may produce a single recognition candidate for an utterance, or may produce a list of recognition candidates. Speech recognition techniques are discussed in U.S. Pat. No. 4,805,218, entitled "METHOD FOR SPEECH ANALYSIS AND SPEECH RECOGNITION," which is incorporated by reference.

Correction mechanisms for previous discrete speech recognition systems displayed a list of choices for each recognized word and permitted a user to correct a misrecognition by selecting a word from the list or typing the correct word. For example, DragonDictate® for Windows®, available from Dragon Systems, Inc. of Newton, Mass., displayed a list of numbered recognition candidates ("a choice list") for each word spoken by the user, and inserted the best-scoring recognition candidate into the text being dictated by the user. If the best-scoring recognition candidate was incorrect, the user could select a recognition candidate from the choice list by saying "choose-N", where "N" was the number associated with the correct candidate. If the correct word was not on the choice list, the user could refine the list, either by typing in the first few letters of the correct word, or by speaking words (e.g., "alpha", "bravo") associated with the first few letters. The user also could discard the incorrect recognition result by saying "scratch that".

Dictating a new word implied acceptance of the previous recognition. If the user noticed a recognition error after dictating additional words, the user could say "Oops", which would bring up a numbered list of previously-recognized words. The user could then choose a previously-recognized word by saying "word-N", where "N" is a number associated with the word. The system would respond by displaying a choice list associated with the selected word and permitting the user to correct the word as described above.

SUMMARY

In one aspect, generally, the invention features correcting incorrect text associated with recognition errors in computer-implemented speech recognition. Speech recognition is performed on an utterance to produce recognition results, and a correction command is identified in the recognition results. A portion of the recognition results is then processed to produce corrected text.

Embodiments of the invention may include one or more of the following features. Previously-generated incorrect text may be replaced with the corrected text. The correction command word may follow or precede the processed portion of the previously generated text in the command. When the correction command indicates that the corrected speech is a pronunciation of a word to be corrected, the corrected text may be produced using confused pronunciation matching to identify text corresponding to the pronunciation. A confused pronunciation dictionary or a traditional pronunciation dictionary may be searched for confused pronunciation matches. A phonetic tree also may be used to search for confused pronunciation matches.

When the correction command indicates that the corrected speech is a spelling of a word to be corrected, the corrected text may be produced by using confused spelling matching to identify the text corresponding to the spelling. A confused spelling dictionary may be searched for confused spelling matches. A spelling tree also may be used to search for confused spelling matches.

Previously generated incorrect text may be automatically selected for replacement by re-recognizing previously-recognized speech using the corrected text to replace a portion of the recognition result. The corrected text may be identified by generating a list of confused pronunciation or spelling matches and identifying the corrected text as a selection from the list. The list may also be used to re-recognize previously-recognized speech so as to determine the corrected text. Text corresponding to the list may also be displayed to a user so as to obtain the selection from the user.

The confused pronunciation or confused spelling searches may be performed using an active vocabulary used to perform the speech recognition. Alternatively, the searches may be performed using a backup dictionary that includes a substantially larger number of words. If the backup dictionary is used and the word used to correct the previously misrecognized word is absent from the active vocabulary, the word may be added to the active vocabulary.

A constraint grammar may be used to perform the speech recognition and re-recognition. Instead of confused pronunciation and confused spelling searches other types of searches including simple pronunciation or spelling searches also may be performed.

In another general aspect, the invention concerns a method for recognizing a spelling of a word in computer-implemented speech recognition. Speech recognition is performed on an utterance to produce recognition results and a spelling command is identified in the recognition results. The utterance is then processed and the spelling is produced by searching a dictionary using the results of the processing step.

Other features and advantages will become apparent from the following description, including the drawings, and from the claims.

BRIEF DESCRIPTION OF THE DRAWING

FIGS. 8A, 8B and 8C are state graphs representing nodes of the lexical tree of FIG. 5.

FIGS. 9 and 10 are charts of scores corresponding to the states of the state graphs of FIGS. 8A, 8B and 8C.

FIGS. 14–16 and 18–20 are flow charts of procedures implemented by a control/interface module of the software of FIG. 2.

DESCRIPTION

Figure 1:
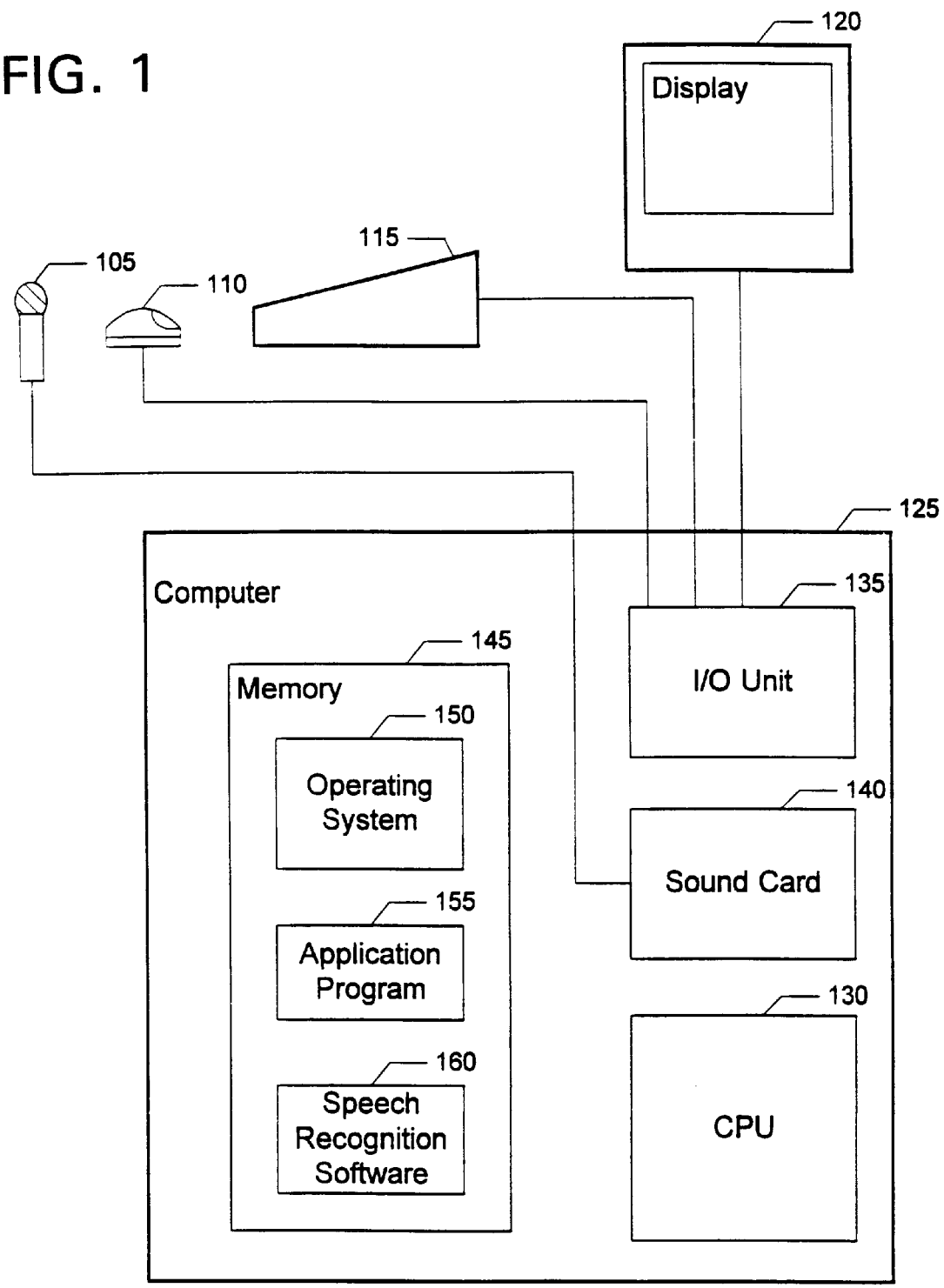
FIG. 1 is a block diagram of a speech recognition system.

FIG. 1 is a block diagram of a speech recognition system 100. The system includes input/output (I/O) devices (e.g., microphone 105, mouse 110, keyboard 115, and display 120) and a general purpose computer 125 having a processor 130, an I/O unit 135 and a sound card 140. A memory 145 stores data and programs such as an operating system 150, an application program 155 (e.g., a word processing program), and speech recognition software 160.

The microphone 105 receives the user's speech and conveys the speech, in the form of an analog signal, to the sound card 140, which in turn passes the signal through an analog-to-digital (A/D) converter to transform the analog signal into a set of digital samples. Under control of the operating system 150 and the speech recognition software 160, the processor 130 identifies utterances in the user's speech. Utterances are separated from one another by a pause having a sufficiently large, predetermined duration (e.g., 160–250 milliseconds). Each utterance may include one or more words of the user's speech.

Figure 2:
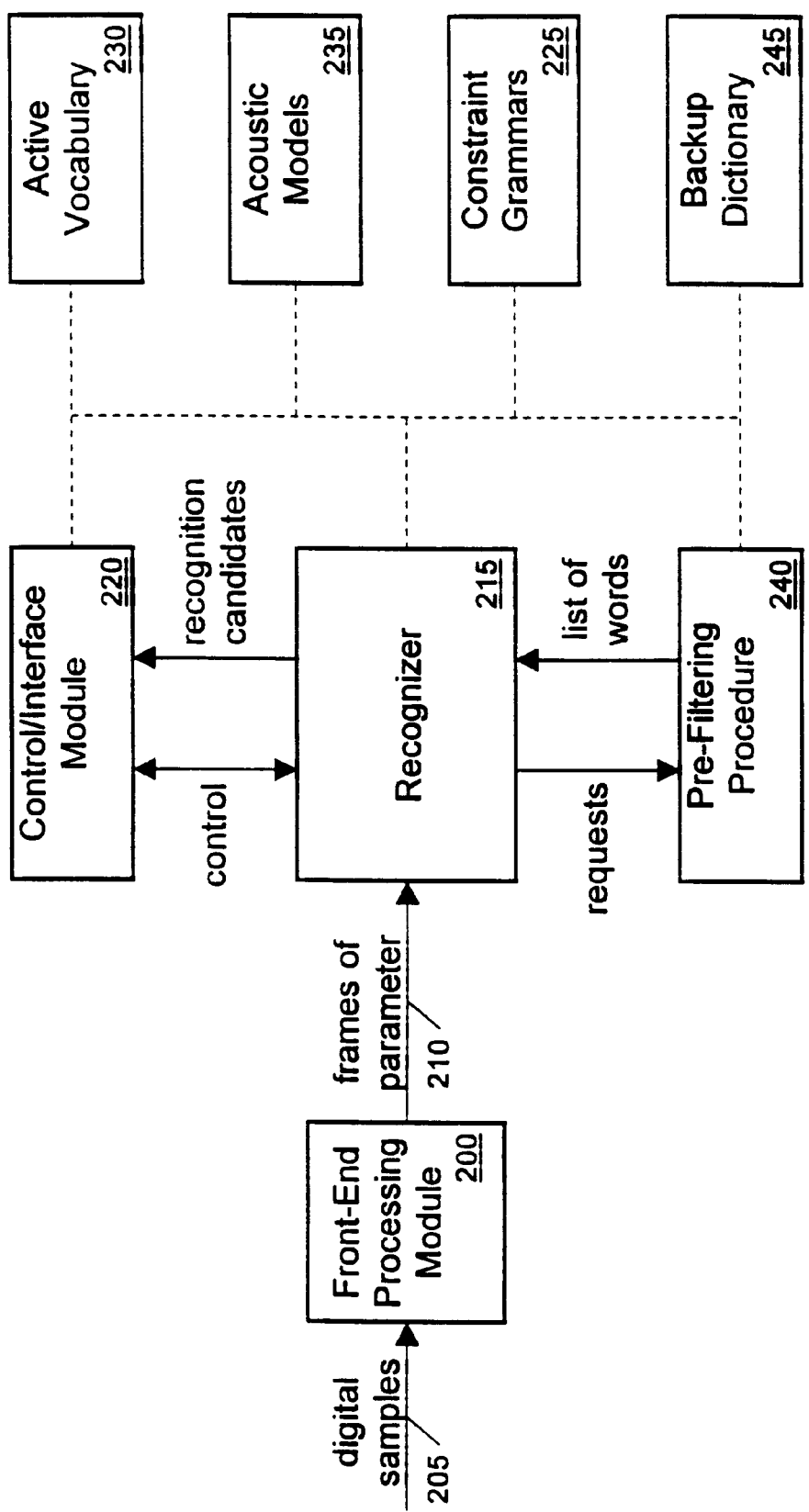
FIG. 2 is a block diagram of speech recognition software of the system of FIG. 1.

FIG. 2 illustrates components of the speech recognition software 160. For ease of discussion, the following description indicates that the components carry out operations to achieve specified results. However, it should be understood that each component actually causes the processor 130 to operate in the specified manner.

Initially, a front end processing module 200 converts the digital samples 205 from the sound card 140 into frames of parameters 210 that represent the frequency content of an utterance. Each frame includes 24 parameters and represents a short portion (e.g., 10 milliseconds) of the utterance.

Figure 3:
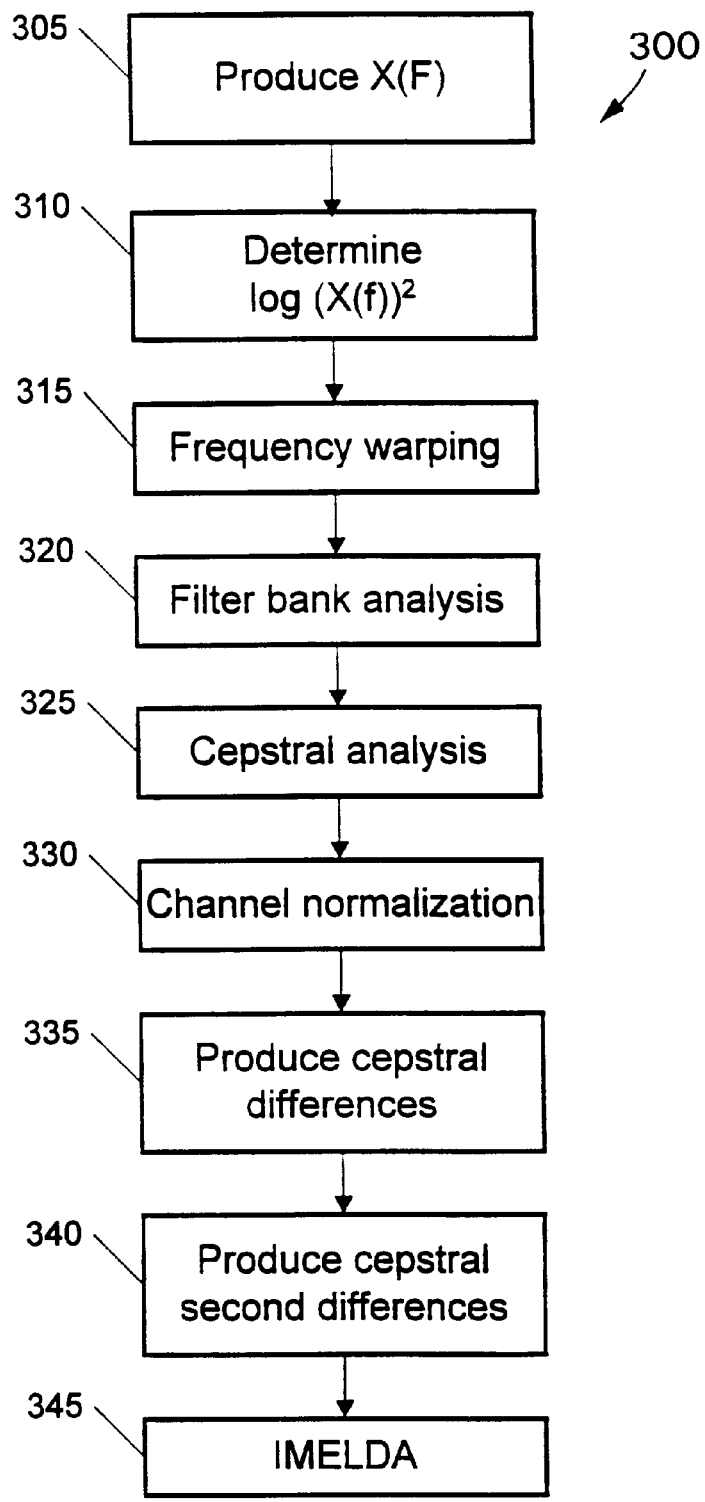
FIG. 3 is a flow chart of a signal processing procedure performed by the software of FIG. 2.

As shown in FIG. 3, the front end processing module 200 produces a frame from digital samples according to a procedure 300. The module first produces a frequency domain representation X(f) of the portion of the utterance by performing a Fast Fourier Transform (FFT) on the digital samples (step 305). Next, the module determines $\log(X(f))^2$ (step 310). The module then performs frequency warping (step 315) and a filter bank analysis (step 320) to achieve speaker normalization. See S. Wegmann et al., "Speaker Normalization on Conversational Speech," *Proc.* 1996 *ICASSP,* pp. I.339–I.341, which is incorporated by reference.

From the normalized results, the module performs cepstral analysis to produce twelve cepstral parameters (step 325). The module generates the cepstral parameters by performing an inverse cosine transformation on the logarithms of the frequency parameters. Cepstral parameters and cepstral differences have been found to emphasize information important to speech recognition more effectively than do the frequency parameters. After performing channel normalization of the cepstral parameters (step 330), the module produces twelve cepstral differences (i.e., the differences between cepstral parameters in successive frames) (step 335) and twelve cepstral second differences (i.e., the differences between cepstral differences in successive frames) (step 340). Finally, the module performs an IMELDA linear combination transformation to select the twenty four most useful parameters from the twelve cepstral parameters, the twelve cepstral differences, and the twelve cepstral second differences (step 345).

Referring again to FIG. 2, a recognizer 215 receives and processes the frames of an utterance to identify text corresponding to the utterance. The recognizer entertains several hypotheses about the text and associates a score with each hypothesis. The score reflects the probability that a hypothesis corresponds to the user's speech. For ease of processing, scores are maintained as negative logarithmic values. Accordingly, a lower score indicates a better match (a high probability) while a higher score indicates a less likely match (a lower probability), with the likelihood of the match decreasing as the score increases. After processing the utterance, the recognizer provides the best-scoring hypotheses to the control/interface module 220 as a list of recognition candidates, where each recognition candidate corresponds to a hypothesis and has an associated score. Some recognition candidates may correspond to text while other recognition candidates correspond to commands. Commands may include words, phrases or sentences.

The recognizer 215 processes the frames 210 of an utterance in view of one or more constraint grammars 225. A constraint grammar, which also may be referred to as a template or restriction rule, may be a limitation on the words that may correspond to an utterance, a limitation on the order or grammatical form of the words, or both. For example, a constraint grammar for menu-manipulation commands may include only entries from the menu (e.g., "file", "edit") or command words for navigating through the menu (e.g., "up", "down", "top", "bottom"). Different constraint grammars may be active at different times. For example, a constraint grammar may be associated with a particular application program 155 and may be activated when the user opens the application program and deactivated when the user closes the application program. The recognizer 215 discards any hypothesis that does not comply with an active constraint grammar. In addition, the recognizer 215 may adjust the score of a hypothesis associated with a particular constraint grammar based on characteristics of the constraint grammar.

Figure 4A:
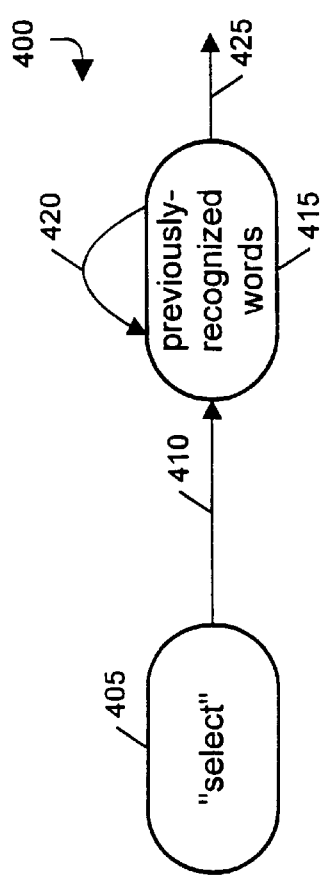
FIGS. 4A and 4B are state diagrams of a constraint grammar.
Figure 4B:
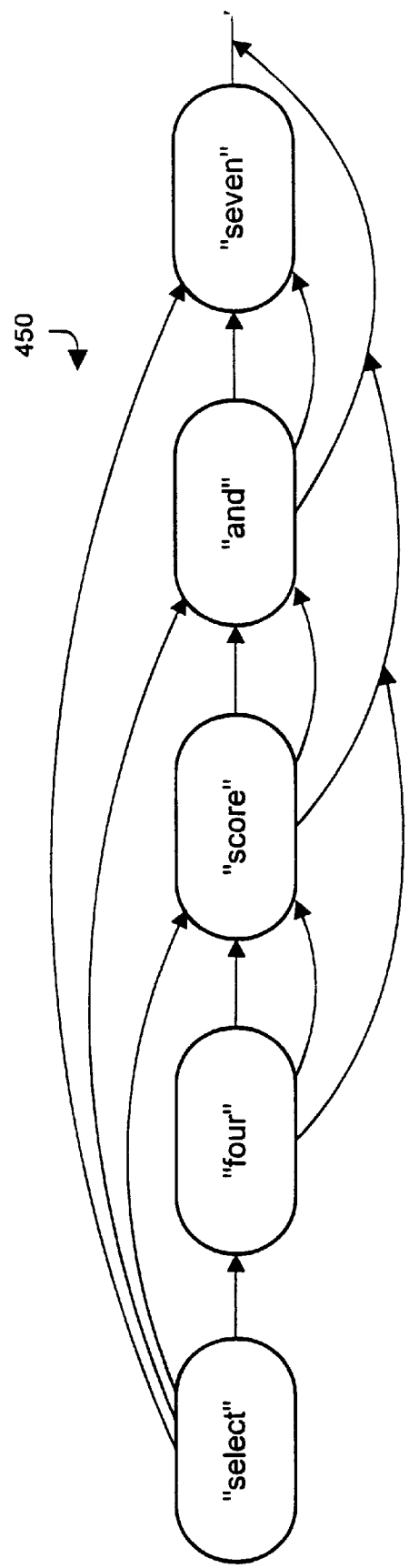

As shown in FIG. 4A, which illustrates the constraint grammar for a "select" command used to select previously recognized text, a constraint grammar may be illustrated as a state diagram 400. The "select" command includes the word "select" followed by one more previously-recognized words, with the words being in the order in which they were previously recognized. The first state 405 of the constraint grammar indicates that the first word of the select command must be "select". After the word "select", the constraint grammar permits a transition along a path 410 to a second state 415 that requires the next word in the command to be a previously-recognized word. A path 420, which returns to the second state 415, indicates that the command may include additional previously-recognized words. A path 425, which exits the second state 415 and completes the command, indicates that the command may include only previously-recognized words. FIG. 4B illustrates the state diagram 450 of the constraint grammar for the select command when a previously-recognized utterance is "four score and seven". This state diagram could be expanded to include words from additional utterances.

The constraint grammar also may be expressed in Backus-Naur Form (BNF) or Extended BNF (EBNF). In EBNF, the grammar for the "Select" command is:

<recognition result>::=Select <word>, where

<word> :: = [PRW$^1$[PRW$^2$[PRW$^3$..PRW$^n$]]] |

[PRW$^2$[PRW$^3$..PRW$^n$]] |..PRW$^n$,

"PRW$^i$" is the previously-recognized word i,

[ ] means optional,

< > means a rule,

| means an OR function, and

:: = means "is defined as" or "is".

As illustrated in FIGS. 4A and 4B, this notation indicates that "select" may be followed by any ordered sequence of previously-recognized words. This grammar does not permit optional or alternate words. In some instances, the grammar may be modified to permit optional words (e.g., an optional "and" to permit "four score and seven" or "four score seven") or alternate words or phrases (e.g., "four score and seven" or "eighty seven"). Constraint grammars are discussed further in U.S. patent application Ser. No. 08/559,207, filed Nov. 13, 1995 and entitled "CONTINUOUS RECOGNITION OF SPEECH AND COMMANDS", which is incorporated by reference.

One constraint grammar 225 that may be used by the speech recognition software 160 is a large vocabulary dictation grammar. The large vocabulary dictation grammar, which also may be referred to as a language model, identifies words included in the active vocabulary 230, which is the vocabulary of words known to the software. The large vocabulary dictation grammar also indicates the frequency with which words occur. The language model may be a unigram model that indicates the frequency with which a word occurs independently of context, or a bigram model that indicates the frequency with which a word occurs in the context of a preceding word. For example, a bigram model may indicate that a noun or adjective is more likely to follow the word "the" than is a verb or preposition. Other constraint grammars 225 include an in-line dictation macros grammar for dictation commands, such as "CAP" to capitalize a word and "New-Paragraph" to start a new paragraph; a select X Y Z grammar used in selecting text, an error correction commands grammar; a dictation editing grammar, an application command and control grammar that may be used to control a particular application program 155; a global command and control grammar that may be used to control the operating system 150 and the speech recognition software 160; a menu and dialog tracking grammar that may be used to manipulate menus; and a keyboard control grammar that permits the use of speech in place of input devices, such as the keyboard 115 or the mouse 110.

The active vocabulary 230 uses a pronunciation model in which each word is represented by a series of phonemes that comprise the phonetic spelling of the word. In particular, each phoneme is represented as a triphone that includes three nodes. A triphone is a context-dependent phoneme. For example, the triphone "abc" represents the phoneme "b" in the context of the phonemes "a" and "c", with the phoneme "b" being preceded by the phoneme "a" and followed by the phoneme "c".

One or more vocabulary files may be associated with each user. The vocabulary files contain all of the words, pronunciations and language model information for the user. Dictation and command grammars may be split between vocabulary files to optimize language model information and memory use, and to keep each single vocabulary file under 64,000 words. There also is a set of system vocabularies.

Each dictation topic (e.g., "medical" or "legal") has its own vocabulary file. This allows the active dictation vocabulary to grow almost as large as 64,000 words, and allows each dictation topic to have its own language model. A dictation topic will consists of a set of words which represent the active vocabulary. There are around 30,000 words in each topic. This represents the words which are considered for normal recognition.

Separate acoustic models 235 are provided for each user of the system. Initially speaker-independent acoustic models of male or female speech are adapted to a particular user's speech using an enrollment program. The acoustic models may be further adapted as the system is used. The acoustic models are maintained in a file separate from the active vocabulary 230.

The acoustic models 235 represent each triphone node as a mixture of Gaussian probability density functions ("PDFs"). For example, node "i" of a triphone "abc" may be represented as ab$^i$c:

$$ab^i c = \sum_k w_k N(\mu_k, c_k),$$

where each $W_k$ is a mixture weight, $$\sum_k w_k = 1,$$

$\mu_k$ is a mean vector for the probability density function ("PDF") $N_k$, and $c_k$ is the covariance matrix for the PDF $N_k$. Like the frames in the sequence of frames, the vectors $\mu_k$ each include 24 parameters. The matrices $c_k$ are twenty four by twenty four matrices. Each triphone node may be represented as a mixture of up to sixteen different PDFs.

A particular PDF may be used in the representation of multiple triphone nodes. Accordingly, the acoustic models represent each triphone node as a collection of mixture weights $w_k$ associated with up to sixteen different PDFs $N_k$ and separately represent each PDF $N_k$ using a mean vector $\mu_k$ and a covariance matrix $c_k$.

The recognizer 215 operates in parallel with a pre-filtering procedure 240. Upon initiating processing of an utterance, the recognizer requests from the pre-filtering procedure a list of words that may have been spoken as the first word of the utterance (i.e., words that may correspond to the first and subsequent frames of the utterance). The pre-filtering procedure performs a coarse comparison of the sequence of frames with the active vocabulary 230 to identify a subset of the vocabulary for which a more extensive comparison using the recognizer is justified.

Figure 5:
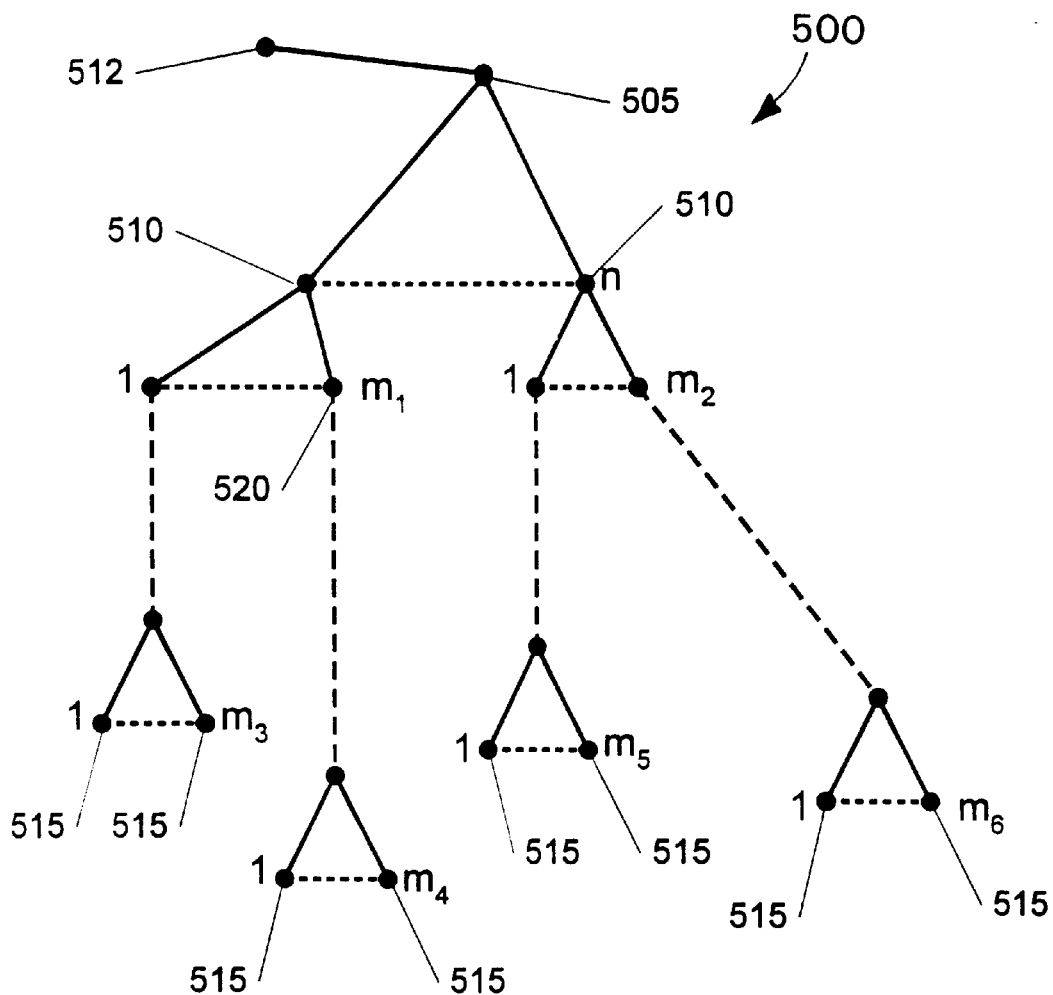
FIG. 5 is a graph of a lexical tree.
Figure 6:
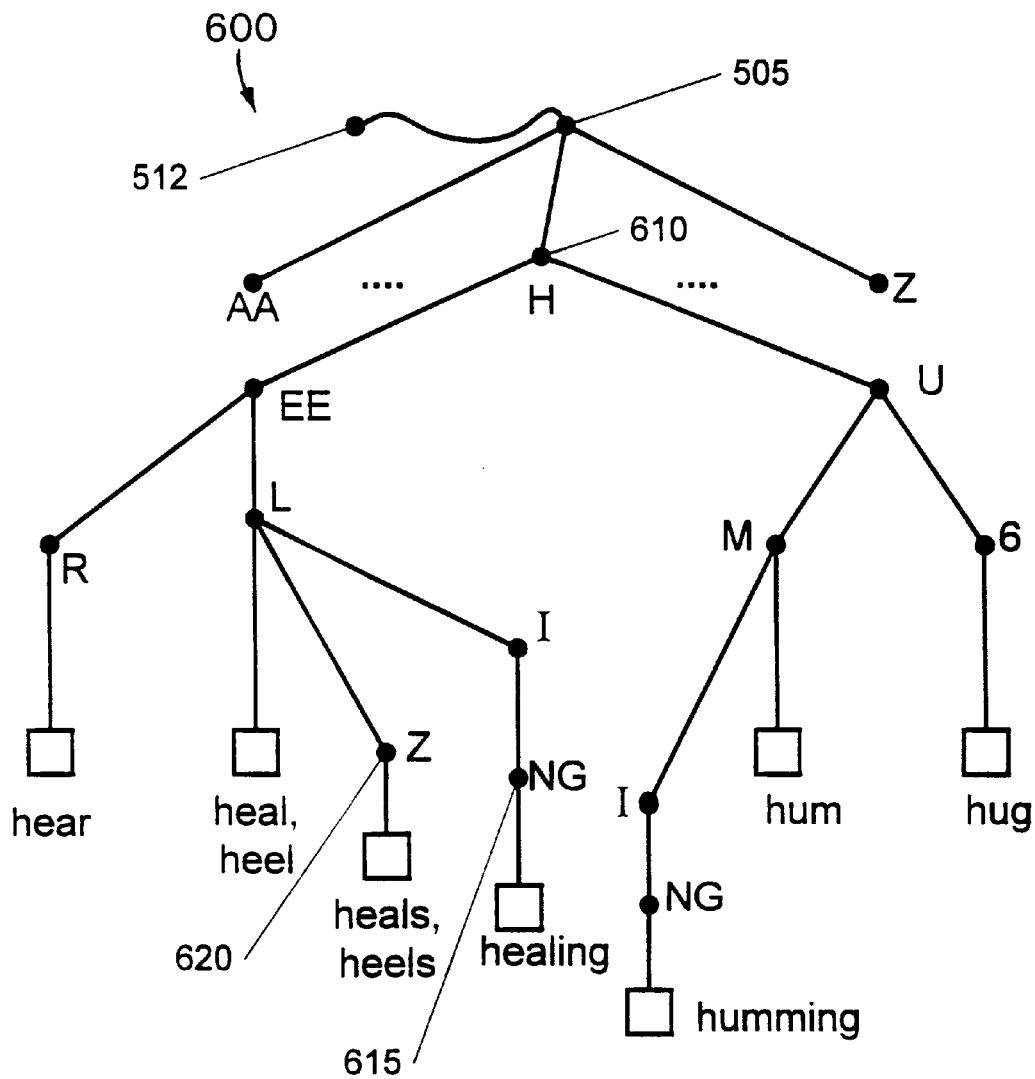
FIG. 6 is a graph of a portion of the lexical tree of FIG. 5.

Referring to FIGS. 5 and 6, the pre-filtering procedure 240 uses a lexical tree 500 that is initialized before processing begins. The lexical tree represents the active vocabulary 230 based on the phonetic relationships between words in the vocabulary. The lexical tree includes a root node 505 that represents new words entering the lexical tree. From the root node 505, the tree expands to a group 510 of nodes that correspond to phonemes with which words start. A silence node 512 that represents silence also may be reached from the root node 505.

Each node in the group 510 represents a phoneme that appears at the beginning of one or more words. For example, in the portion 600 of the lexical tree 500 illustrated in FIG. 6, a node 610 corresponds to all words in the vocabulary that start with the phoneme "H". Together, the nodes in the group 510 include representations of the starting phoneme of every word in the vocabulary.

The lexical tree continues to expand until it reaches leaf nodes 515 that represent the actual words of the vocabulary. For example, as indicated by the square marker, leaf node 615 of FIG. 6 corresponds to the word "healing". An internal node of the tree also may represent a word of the vocabulary. For example, the node 520 might represent a particular vocabulary word in addition to representing the first two phonemes of other vocabulary words. Similarly, the leaf node 620 of FIG. 6 corresponds to the words "heal" and "heel" while also corresponding to the first three phonemes of the words "heals", "heels" and "healing". Node 620 also illustrates that, since multiple words may have the same phonetic spelling, a leaf node may correspond to more than one word. As illustrated in FIG. 6, leaf nodes may appear at different levels within the lexical tree. Leaf nodes also may correspond to commands. For example, a leaf node may correspond to the word "select" and to the command "SELECT". As noted above, commands may be associated with particular constraint grammars 225.

Figure 7:
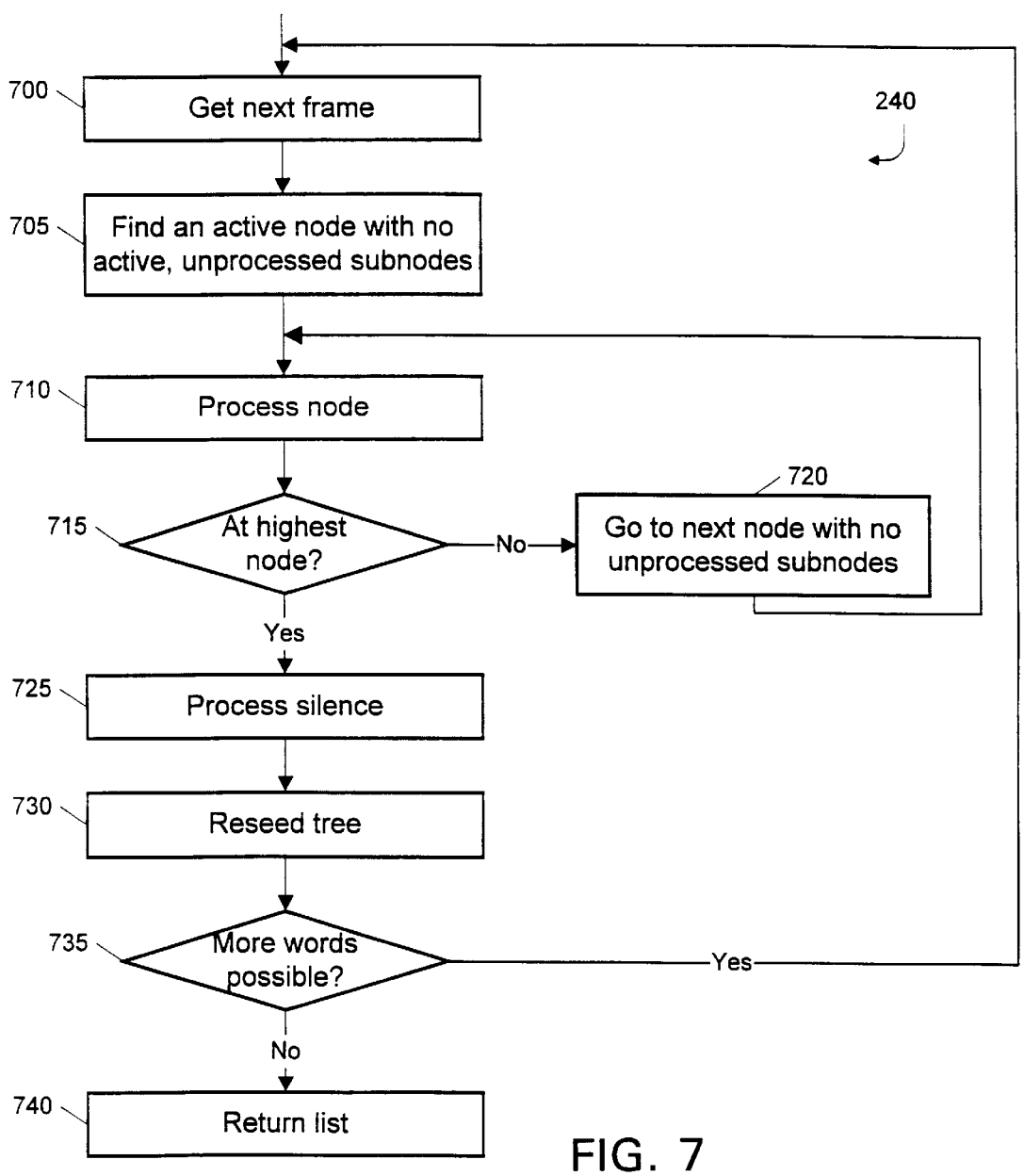
FIG. 7 is a flow chart of a pre-filtering procedure performed by the software of FIG. 2.

Operation of the pre-filtering procedure 240 is illustrated in FIG. 7. The pre-filtering procedure begins by retrieving the next frame of parameters for an utterance (step 700). Immediately after initialization, the next frame will be the first frame for the utterance. Thereafter, the next frame will be the frame following the last frame that was processed by the pre-filtering procedure when the pre-filtering procedure was last called. The pre-filtering procedure does not reinitialize the lexical tree between requests for list of words. Accordingly, the state of the lexical tree when a list of words is requested corresponds to the state of the lexical tree after a previous list of words was returned.

After retrieving a frame of data, the pre-filtering procedure finds an active node in the tree with no unprocessed active successors (step 705). Successors of a node also may be referred to as subnodes of the node. When the lexical tree is initialized, the silence node 512 is the only active node.

Next, the pre-filtering procedure processes the current node (step 710) according to a node-processing procedure 1100 that is discussed below with reference to FIG. 11. The node-processing procedure determines whether the node should spawn additional active nodes and whether the node should be rendered inactive. If the node is a leaf node, the node-processing procedure also determines whether the word corresponding to the node should be added to a word list for a time associated with the node.

After processing the node (step 710), the pre-filtering procedure determines whether the node is the highest node in the tree (i.e., the root node) (step 715). If the node is not the highest node, then the pre-filtering procedure goes to the next node having no unprocessed active subnodes (step 720) and processes that node (step 710). When searching for the next node to process, the pre-filtering procedure considers inactive nodes having active subnodes or active siblings.

If the processed node is the highest active node (step 715), then the pre-filtering procedure processes the silence node 512 (step 725). In general, the silence node is processed by comparing a frame to a model for silence and adding the resulting score to the minimum of the current score for the silence node and the score for the root node 505.

Next, the pre-filtering procedure reseeds the lexical tree (step 730). The pre-filtering procedure reseeds the tree whenever the silence node 512 is active or a word was produced by a leaf node of the lexical tree, regardless of whether the word was added to the list of words. The pre-filtering procedure reseeds the tree by replacing the score for the root node 505 with the minimum of the score for the silence node 512 and the scores for any words produced by leaf nodes of the lexical tree for the current frame. If the silence node is inactive and no leaf node has produced a word, then the pre-filtering procedure replaces the score for the root node 505 with a bad score (i.e., a score having a value larger than a pruning threshold).

Next, the pre-filtering procedure determines whether more words may be added to the word list for the requested time (step 735). If there are no active nodes in the lexical tree corresponding to speech that started at, before, or slightly after the start time for which the list was requested, and if the last frame to be processed corresponds to a time that is slightly after the start time for which the list was requested, then no more words may be added to the word list. A word produced by the lexical tree is added to the list of words corresponding to the start time of the word and to lists of words corresponding to times that precede and follow the start time of the word. It is for this reason that the pre-filtering procedure waits until there are no active nodes in the tree corresponding to speech that started slightly after the start time for the list of words. If more words may be added, then the pre-filtering procedure retrieves the next frame of parameters (step 700) and repeats the steps discussed above.

If words cannot be added to the word list (step 735), then the pre-filtering procedure returns the word list (step 740) to the recognizer 215. If the word list includes more than a predefined number of words, then the pre-filtering procedure removes words from the list prior to returning the list. The pre-filtering procedure removes the words that are least likely to correspond to the user's speech and removes enough words to reduce the number of words on the list to the predefined number.

The procedure also deletes any lists of words for times prior to the requested start time.

Each node of the lexical tree 500 (FIG. 5) represents a sequence of states for a particular phoneme. For example, FIG. 8A illustrates a node 800 that includes a first state 805, a second state 810, and a third state 815. A comparison with a frame of parameters may cause the score in a particular state to remain in the state (through a path 820). A score remains in the state when the score, after being adjusted based on a comparison with a model for the state, is better than a score passed from a preceding state or node, or when no score is passed from a preceding state or node. The comparison also may cause the score to be passed to a subsequent state through a path 825. A score is passed to a subsequent state when the score, after being adjusted based on a comparison with a model for the subsequent state, is better than the score in the subsequent state, or when no score is associated with the subsequent state. The score for the third state 815 may be passed to one or more subsequent nodes through a path 830.

Referring to FIG. 8B, the node 512 that corresponds to silence is represented by a single state 840. Each comparison with a frame of parameters may cause a score in the node to remain in the state 840 (through the path 845) and also may cause the score to be passed to the root node 505 through a path 850.

Referring to FIG. 8C, the root node 505 is represented by a single state 860. Comparison with a frame causes the score in the node to be passed to one or more subsequent nodes (including the silence node 512) through a path 865.

Each state of a node may be represented by four values: a score, a starting time, a leaving penalty, and a staying penalty. The score represents the likelihood that a series of frames has placed the lexical tree in the state (i.e., the probability that the series of frames corresponds to the word or portion of a word to which the state corresponds). The scores are maintained as negative logarithmic values.

The starting time identifies the hypothesized time at which the user began to speak the word or words represented by the state. In particular, the starting time identifies the time at which the score associated with the state entered the lexical tree (i.e., the time at which the score was passed from the state 840 along the path 850).

The leaving and staying penalties are fixed values associated with the state. The staying penalty is added to any score that stays in the state. The staying penalty is related inversely to the length of the sound represented by the state and to the length of the phoneme represented by the node to which the state belongs. For example, the staying penalty could be proportional to $-\log(1-1/d_{avg})$, where $d_{avg}$ is the average duration, in frames, of the sound represented by the state. Thus, the staying penalty has a relatively large value when the sound corresponding to the state occurs for only a small amount of time and a relatively small value when the sound corresponding to the state occurs for a large amount of time.

The leaving penalty is added to any score that exits the state, and includes a duration component and a language model component. The duration component is related directly to the length of the sound represented by the state and to the length of the phoneme represented by the node to which the state belongs. For example, the duration component of the leaving penalty could be proportional to $-\log(1/d_{avg})$. Thus, the duration component of the leaving penalty has a relatively large value when the sound corresponding to the state occurs for a large amount of time and a relatively small value when the sound corresponding to the state occurs for a small amount of time.

The language model components of the leaving penalties for all states in a particular node together represent a language model score for the phoneme associated with that node. The language model score represents the likelihood that a word including the phoneme will occur in speech. The language model score included in the leaving penalties for a node is the increase in the best language model score for the branch of the lexical tree that begins with the node relative to the branch of the lexical tree that begins with the node's parent.

The following discussion assumes that there are no leaving or staying penalties associated with the state 840 or the state 860. The same result could be achieved by setting the leaving and staying penalties for states 840 and 860 equal to zero. The following discussion also assumes that the first frame is the first frame that may correspond to speech instead of silence.

FIG. 9 provides a simplified example of how scores propagate through the lexical tree. Before the first frame is retrieved (row 900), state 840 which corresponds to silence) has a score of 0 and no other nodes are active. The score of 0 means that there is a one hundred percent probability that the system is starting from silence.

After the first frame is retrieved (row 905), the score for the state 840 ($S_{A1}$) is set equal to the acoustic score ($A_{A1}$) resulting from an acoustic match of the first frame with an acoustic model corresponding to the state 840 (i.e., the acoustic model for silence). Thus, the score for the state 840 ($S_{A1}$) is set equal to the likelihood that the first frame corresponds to silence.

Retrieval of the first frame also causes the state 805 to become an active state. Assuming that the node 800 corresponds to a phoneme that starts a word, the score for the state 805 ($S_{B1}$) is set equal to the acoustic score ($A_{B1}$) resulting from an acoustic match of the first frame with the acoustic model corresponding to the state 805. Thus, the score for the state 805 ($S_{B1}$) is set equal to the likelihood that the first frame corresponds to the state 805. The starting time for the state 805 is set equal the time associated with the first frame. This value for the starting time indicates that the score at state 805 represents a word that started at a time corresponding to the first frame. The starting time moves with the score as the score propagates through the lexical tree.

After the second frame is retrieved (row 910), the score for the state 840 ($S_{A2}$) is set equal to the sum of the previous score for the state ($S_{A1}$) and the acoustic score ($A_{A2}$) resulting from an acoustic match of the second frame with the acoustic model for silence:

$$S_{A2}=S_{A1}+A_{A2}=A_{A1}+A_{A2}.$$

As noted above, each of the scores corresponds to a negative logarithmic probability. Accordingly, adding scores together corresponds to multiplying the probabilities.

Thus, the score for the state 840 ($S_{A2}$) equals the likelihood that both of the first and second frames correspond to silence. This process is repeated for subsequent frames (e.g., lines 915 and 920) so that the score for the state 840 at a frame "n" ($S_{An}$) equals:

$$S_{An} = S_{An-1} + A_{An} = \sum_{m=1}^{n} A_{Am}.$$

This expression assumes that the silence node 512 is not reseeded from the root node 505. If reseeding occurs at a frame n, then the value of $S_{An-1}$ would, be replaced by the score in the root node 505 for the frame n-1.

After the second frame is retrieved, the score for the state 805 ($S_{B2}$) is set equal to:

$$S_{B2}=\min\ (S_{B1}+\text{Stay}_B,S_{A1})+A_{B2},$$

where $A_{B2}$ is the acoustic score resulting from an acoustic match of the second frame with the acoustic model corresponding to state 805 and $stay_B$ is the staying penalty for state 805. The score for state 805 ($S_{B2}$) corresponds to the more likely of two alternatives: (1) the first frame was silence and the second frame was the sound represented by the state 805 or (2) both of the first and second frames were the sound represented by the state 805. The first alternative corresponds to a transition from state 840 to state 805 along the path 850. The second alternative corresponds to a transition from state 805 back to state 805 along path 820. Where the first alternative is the more likely, the starting time corresponding to the first frame that was stored previously for the state 805 is replaced by a value corresponding to the second frame. This value indicates that the score at state 805 represents a word that started with the second frame.

After the second frame is retrieved, the state 810 becomes an active state. The score for the state 810 ($S_{C2}$) is set equal to:

$$S_{C2}=S_{B1}+\text{leave}_B+A_{C2},$$

Where $A_{C2}$ is the acoustic score resulting from an acoustic match of the second frame with the acoustic model corresponding to state 810 and $leave_B$ is the leaving penalty or the state 805. Similarly, $leave_c$ and $leave_d$ are leaving penalties for, respectively, states 810 and 815. The sum of language model components of $leave_B$, $leave_C$ and $leave_D$ represents the language model score for the phoneme represented by the node 800.

The methodology for determining state scores for states other than the silence state can be expressed more generally as:

$$S_{i,j}=\min(S_{i,j-1}+\text{stay}_i, S_{i-1,j-1}+\text{leave}_{j-1})+A_{i,j}.$$

for i greater than zero (where i equals zero corresponds to silence), and with the boundary condition that the score for an inactive state equals infinity or some sufficiently large value. The starting time for the state may be represented as:

$$t_{i,j}=t_{i,j-1} \text{ for } S_{i,j-1}+\text{stay}_i \leq S i-1, j-1+\text{leave}_{j-1},$$

or $$t_{i,j}=t_{i,j-1} \text{ for } S_{i-1},j-1+\text{stay}_i > S i-1, j-1+\text{leave}_{j-1},$$

for i and j greater than zero and with the boundary condition that the time value for a newly active state represents the frame at which the state became active. As previously noted, state scores for the silence state may be determined as:

$$S_{0,j} = S_{0,j-1} + A_{0,j} = \sum_{m=1}^{j} A_{0,m}.$$

with the boundary condition that $S_{0,0}$ equals zero. An even more general form, in which the scores are expressed as functions of the various parameters, is illustrated in FIG. 10.

Figure 11:
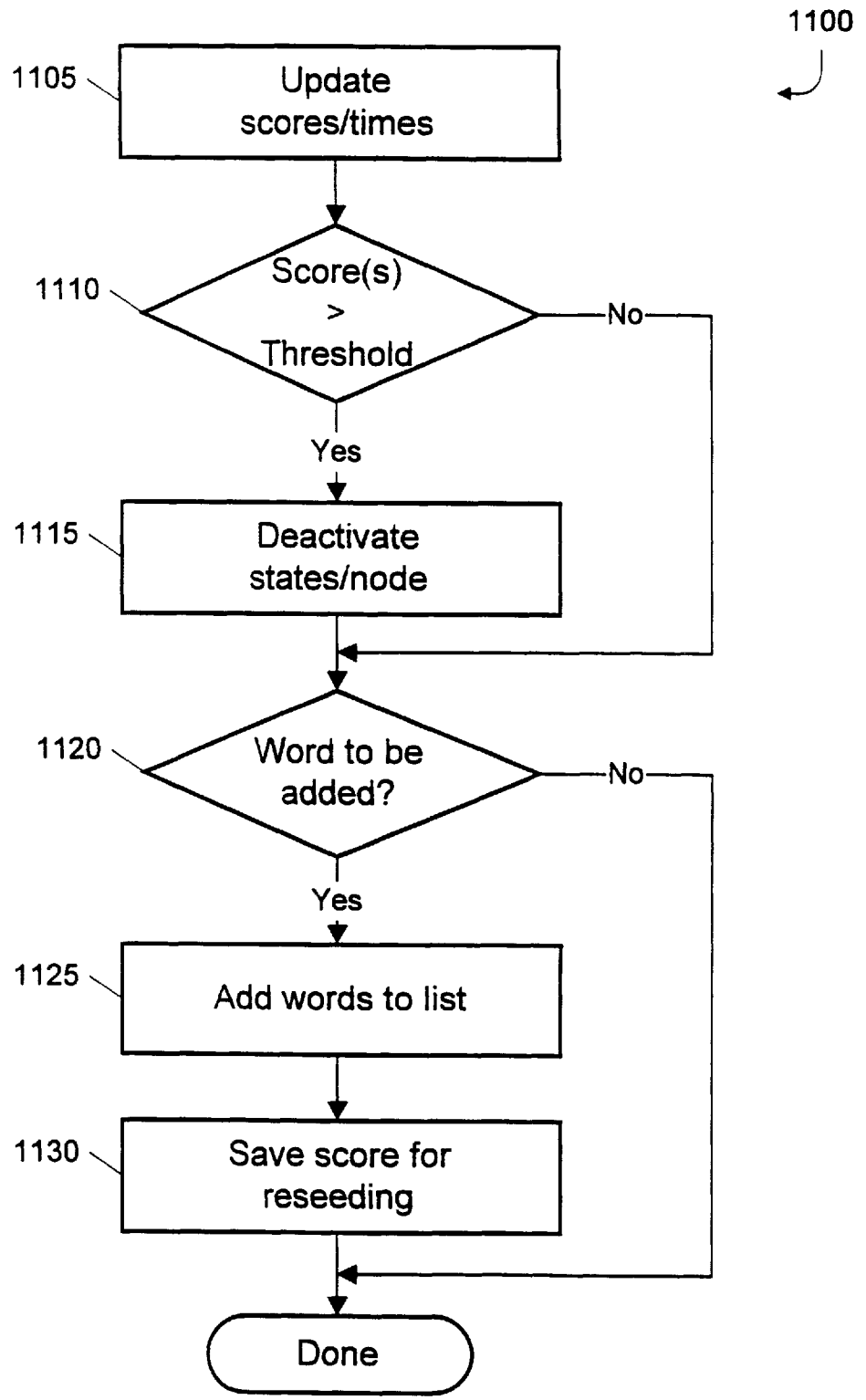
FIG. 11 is a flow chart of a procedure for processing nodes of a lexical tree.

Referring to FIG. 11, a node may be processed according to a node-processing procedure 1100. Initially, the node-processing procedure updates the scores and time values for each state of the node (step 1105). The node-processing procedure updates the scores and time values by generating acoustic scores arid using the equations discussed above.

When the last state of the node was active prior to updating the scores for the node, the node-processing procedure uses the score for the last state to generate scores for any inactive subnodes of the node. If the generated score for a subnode does not exceed a pruning threshold, then the node-processing procedure activates that subnode and provides the subnode with the generated score.

Next, the node-processing procedure determines whether the score of any state of the node exceeds the pruning threshold (step 1110). When a score exceeds the pruning threshold, the likelihood that the word represented by the score was spoken is deemed to be too small to merit further consideration. For this reason, the procedure prunes the lexical tree by deactivating any state having a score that exceeds the pruning threshold (step 1115). If every state of the node is deactivated, then the node-processing procedure also deactivates the node. The node-processing procedure may deactivate a node or state by deleting a record associated with the node or state, or by indicating in the record that the node or state is inactive. Similarly, the node-processing procedure may activate a node or state by creating a record and associating the record with the node or state, or by indicating in an existing record that the node or state is active. The procedure may use a dynamic pruning threshold that accounts for variations in the average or best score in the lexical tree at any given time.

Next, the node-processing procedure determines whether a word is to be added to a list of words (step 1120). A word is added to the list of words when the node being processed corresponds to the last phoneme of a word, a score has been propagated out of the last state of the node, and the score is less than a list threshold. Before comparing the score to the list threshold, the node-processing procedure adds a language model score to the score. The language model score corresponds to the difference between the language model score for the word and the incremental language model score that is already included in the score. In general, the list threshold has a lower value than the pruning threshold. If the node being processed corresponds to the last phoneme of multiple words having the same phonetic spelling, then all of the words to which the node corresponds are added to the list of words.

If the noted conditions are met, the node-processing procedure adds the word or words to the list (step 1125). A word is stored in the list of words along with the score propagated out of the last state. If the word is on the list already, then the node-processing procedure stores with the list the better of the score already stored with the list or the score propagated out of the last state. The scores for words in a list of words are returned along with the list of words. The recognizer 215 uses these scores in making the detailed match.

The node-processing procedure also adds the word to lists of words for times that precede or follow the starting time to account for possible inaccuracies in the starting time of the word that may result from selecting the better of a score that remains in a state or a score propagated from a prior state. Spreading the word across multiple lists ensures that these inaccuracies will not impinge on the accuracy of the speech recognition system. The node-processing procedure spreads the word across multiple lists based on the length of the word.

After adding a word to the list of words (step 1125), the node-processing procedure saves the score associated with the word as a reseeding score for use in reseeding the tree (step 1130). Production of a word by the lexical tree means that the current frame may correspond to the last frame of the word (with the probability of such a correspondence being reflected by the score associated with the word). This means that the next frame may correspond to the beginning of a word or to silence resulting from a pause between words. The pre-filtering procedure reseeds the tree (step 730 of FIG. 7) to account for this possibility.

For a given frame, multiple nodes may produce words. However, the tree only needs to be reseeded once. To account for this, the node-processing procedure only saves the score associated with a word ($S_w$) as the reseeding score ($S_{RS}$) if the word is the first word to be generated by the tree for the current frame of if the word score is less than the score for all other words generated by previously-processed nodes for the current frame ($S_{RS}'$):

$$S_{RS} = \min(S_W, S_{RS}').$$

Saving only the lowest score (i.e., the score indicating the highest probability that the current frame was the last frame of a word) ensures that the tree will be reseeded using the highest probability that the next frame is the first frame of a new word.

To reseed the tree (step 730 of FIG. 7), the pre-filtering procedure activates the root node 505 and associates the minimum of the reseeding score ($S_{RS}$) and the score for the silence node 512 with the root node. During processing of the next frame, the active root node 505 may be used to activate nodes in the group 510 or to activate the silence node 512.

Processing of the node is complete after the node-processing procedure saves a score for use in reseeding the tree (step 1130), or if no word is to be added to the list of words (step 1120). The lexical tree pre-filtering procedure is discussed in detail in U.S. patent application Ser. No. 08/701,393, filed on Aug. 22, 1996 and entitled "LEXICAL TREE PRE-FILTERING IN SPEECH RECOGNITION", which is incorporated by reference.

After the pre-filtering procedure responds with the requested list of words, the recognizer initiates a hypothesis for each word from the list and compares acoustic models for the word to the frames of parameters representing the utterance. The recognizer uses the results of these comparisons to generate scores for the hypotheses. Hypotheses having excessive scores are eliminated from further consideration. As noted above, hypotheses that comply with no active constraint grammar also are eliminated.

When the recognizer determines that a word of a hypothesis has ended, the recognizer requests from the pre-filtering procedure a list of words that may have been spoken just after the ending-time of the word. The recognizer then generates a new hypotheses for each word on the list, where the new hypothesis includes the words of the old hypothesis plus the new word.

In generating the score for a hypothesis, the recognizer uses acoustic scores for words of the hypothesis, a language model score that indicates the likelihood that words of the hypothesis are used together, and scores provided for each word of the hypothesis by the pre-filtering procedure. The scores provided by the pre-filtering procedure include components corresponding to a crude acoustic comparison and a language model score indicative of the likelihood that a word is used, independently of context. The recognizer may eliminate any hypothesis that is associated with a constraint grammar (e.g., a command hypothesis), but does not comply with the constraint grammar.

Figure 12:
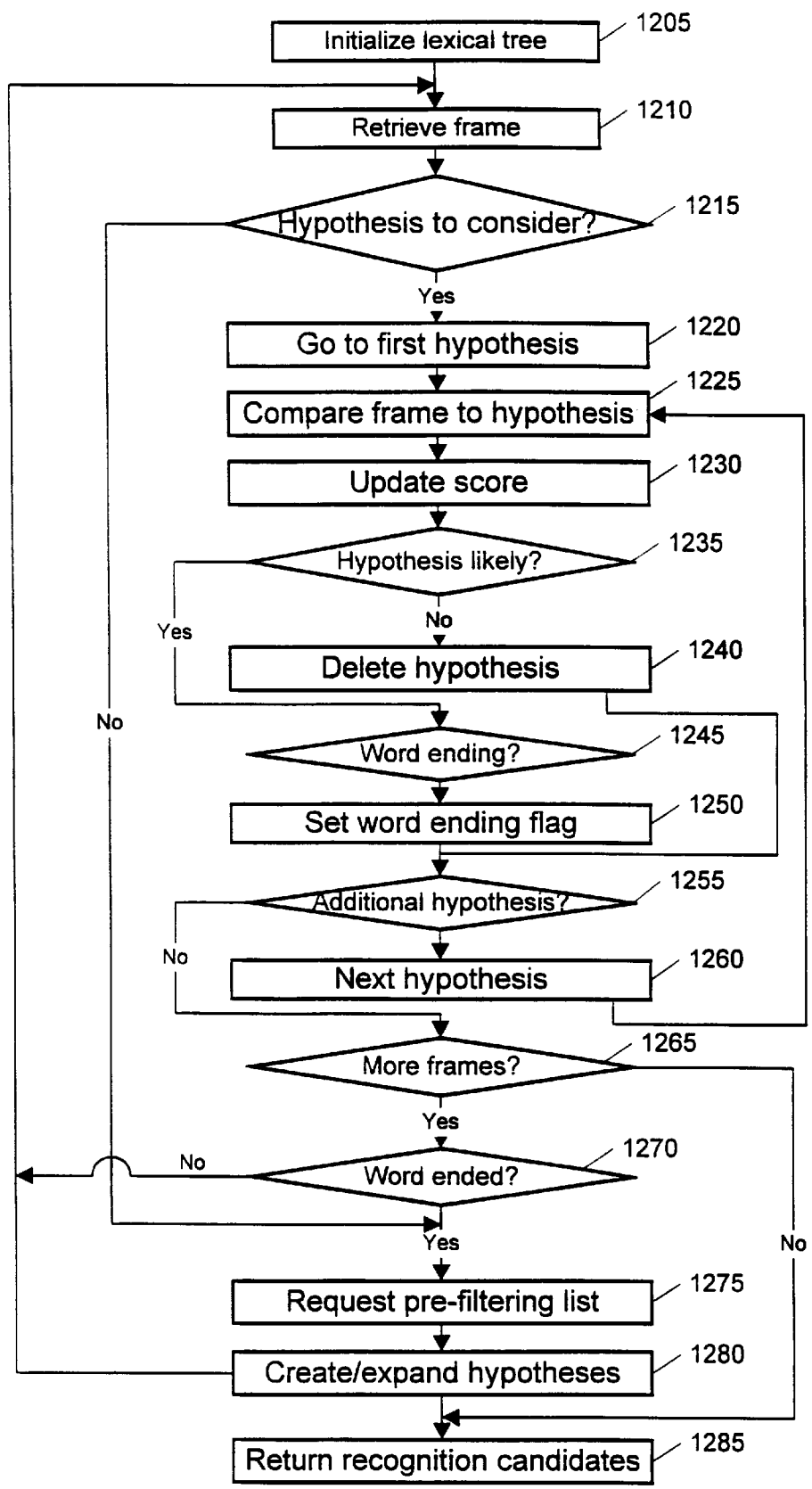
FIG. 12 is a flow chart of a speech recognition procedure.

Referring to FIG. 12, the recognizer 215 operates according to a procedure 1200. First, prior to processing, the recognizer 215 initializes the lexical tree 500 as described above (step 1205). The recognizer 215 then retrieves a frame of parameters (step 1210) and determines whether there are hypotheses to be considered for the frame (step 1215). The first frame always corresponds to silence so that there are no hypotheses to be considered for the first frame.

If hypotheses need to be considered for the frame (step 1215), then the recognizer 215 goes to the first hypothesis (step 1220). The recognizer then compares the frame to acoustic models 235 for the last word of the hypothesis (step 1225) and, based on the comparison, updates a score associated with the hypothesis (step 1230).

After updating the score (step 1230), the recognizer determines whether the user was likely to have spoken the word or words corresponding to the hypothesis (step 1235). The recognizer makes this determination by comparing the current score for the hypothesis to a threshold value. If the score exceeds the threshold value, then the recognizer 215 determines that the hypothesis is too unlikely to merit further consideration and deletes the hypothesis (step 1240).

If the recognizer determines that the word or words corresponding to the hypothesis were likely to have been spoken by the user, then the recognizer determines whether the last word of the hypothesis is ending (step 1245). The recognizer determines that a word is ending when the frame corresponds to the last component of the model for the word. If the recognizer determines that a word is ending (step 1245), the recognizer sets a flag that indicates that the next frame may correspond to the beginning of a word (step 1250).

If there are additional hypotheses to be considered for the frame (step 1255), then the recognizer selects the next hypothesis (step 1260) and repeats the comparison (step 1225) and other steps. If there are no more hypotheses to be considered for the frame (step 1255), then the recognizer determines whether there are more frames to be considered for the utterance (step 1265). The recognizer determines that there are more frames to be considered when two conditions are met. First, more frames must be available. Second, the best scoring node for the current frame or for one or more of a predetermined number of immediately preceding frames must have been a node other than the silence node (i.e., the utterance has ended when the silence node is the best scoring node for the current frame and for a predetermined number of consecutive preceding frames).

If there are more frames to be considered (step 1265) and the flag indicating that a word has ended is set (step 1270), or if there were no hypotheses to be considered for the frame (step 1215), then the recognizer requests from the pre-filtering procedure 240 a list of words that may start with the next frame (step 1275).

Upon receiving the list of words from the pre-filtering procedure, the recognizer uses the list of words to create hypotheses or to expand many hypothesis for which a word has ended (step 1280). Each word in the list of words has an associated score. Prior to adding a list word to a hypothesis, the recognizer modifies the list score ($S_L$) for the word to produce a modified list score ($S_{ML}$) as:

$$S_{ML} = S_L + L_C - L_L,$$

where $L_C$ is a language model score that represents the frequency with which the pair of words that includes the list word and the immediately preceding word in the hypothesis are used together in speech, and $L_L$ is a language model score included in the list score and corresponds to the frequency with which the list word is used in speech, without reference to context. The recognizer then adds the modified list score to the score for the hypothesis and compares the result to a threshold value. If the result is less than the threshold value, then the recognizer maintains the hypothesis. Otherwise, the recognizer determines that the hypothesis does not merit further consideration and abandons the hypothesis. As an additional part of creating or expanding the hypotheses, the recognizer compares the hypotheses to the active constraint grammars 225 and abandons any hypothesis that corresponds to no active constraint grammar. The recognizer then retrieves the next frame (step 1210) and repeats the procedure.

If there are no more speech frames to process, then the recognizer 215 provides the most likely hypotheses to the control/interface module 220 as recognition candidates (step 1285).

The control/interface module 220 controls operation of the speech recognition software and provides an interface to other software or to the user. The control/interface module receives the list of recognition candidates for each utterance from the recognizer. Recognition candidates may correspond to dictated text, speech recognition commands, or external commands. When the best-scoring recognition candidate corresponds to dictated text, the control/interface module provides the text to an active application, such as a word processor. The control/interface module also may display the best-scoring recognition candidate to the user through a graphical user interface. When the best-scoring recognition candidate is a command, the control/interface module 220 implements the command. For example, the control/interface module may control operation of the speech recognition software in response to speech recognition commands and may forward other commands to the appropriate software.

The control/interface module also controls the active vocabulary, acoustic models, and constraint grammars that are used by the recognizer. For example, when the speech recognition software is being used in conjunction with a particular application (e.g., Microsoft Word), the control/interface module updates the active vocabulary to include command words associated with that application and activates constraint grammars associated with the application.

Other functions provided by the control/interface module include an enrollment program, a vocabulary customizer, and a vocabulary manager. The enrollment program collects acoustic information from a user and trains or adapts a user's models based on that information. The vocabulary customizer optimizes the language model of a specific topic by scanning user supplied text. The vocabulary manager is a developer tool which is used to browse and manipulate vocabularies, grammars and macros. Each function of the control/interface module 220 may be implemented as an executable program that is separate from the main speech recognition software.

A complete dictation vocabulary consists of the active vocabulary plus a backup dictionary 245. The backup dictionary may include files that contain user-specific backup vocabulary words and system-wide backup vocabulary words. User-specific backup vocabulary words include words which a user has created while using the speech recognition software (up to a limit of 64,000 words). These words are stored in vocabulary files for the user and for the dictation, and are available as part of the backup dictionary for the dictation topic regardless of user, and to the user regardless of which dictation topic is being used. For example, if a user is using a medical topic and adds the word "ganglion" to the dictation vocabulary, any other user of the medical topic will have immediate access to the word "ganglion". In addition, the word will be written into the user-specific backup vocabulary. Then, if the user says "ganglion" while using a legal topic, the word "ganglion" will be available during correction from the backup dictionary. In general, the backup dictionary includes substantially more words than are included in the active vocabulary. For example, when the active vocabulary 230 has 60,000 or so entries, the backup dictionary may have 200,000 or so entries. The active vocabulary 230 is a dynamic vocabulary in that entries may be added or subtracted from the active vocabulary over time. For example, when the user indicates that an error has been made and the control/interface module 220 uses the backup dictionary 245 to correct the error, a new word from the backup dictionary 245 may be added to the active vocabulary 230 to reduce the likelihood that the misrecognition will be repeated.

In addition to the user-specific backup dictionaries noted above, there is a system-wide backup dictionary. The system-wide backup dictionary contains all the words known to the system, including words which may currently be in an active vocabulary.

The control/interface module implements error correction procedures of the software 160. During error correction, word searches of the backup vocabularies start with the user-specific backup dictionary and then check the system-wide backup dictionary. The backup dictionaries also are searched when there are new words in text that a user has typed.

Figure 13A:
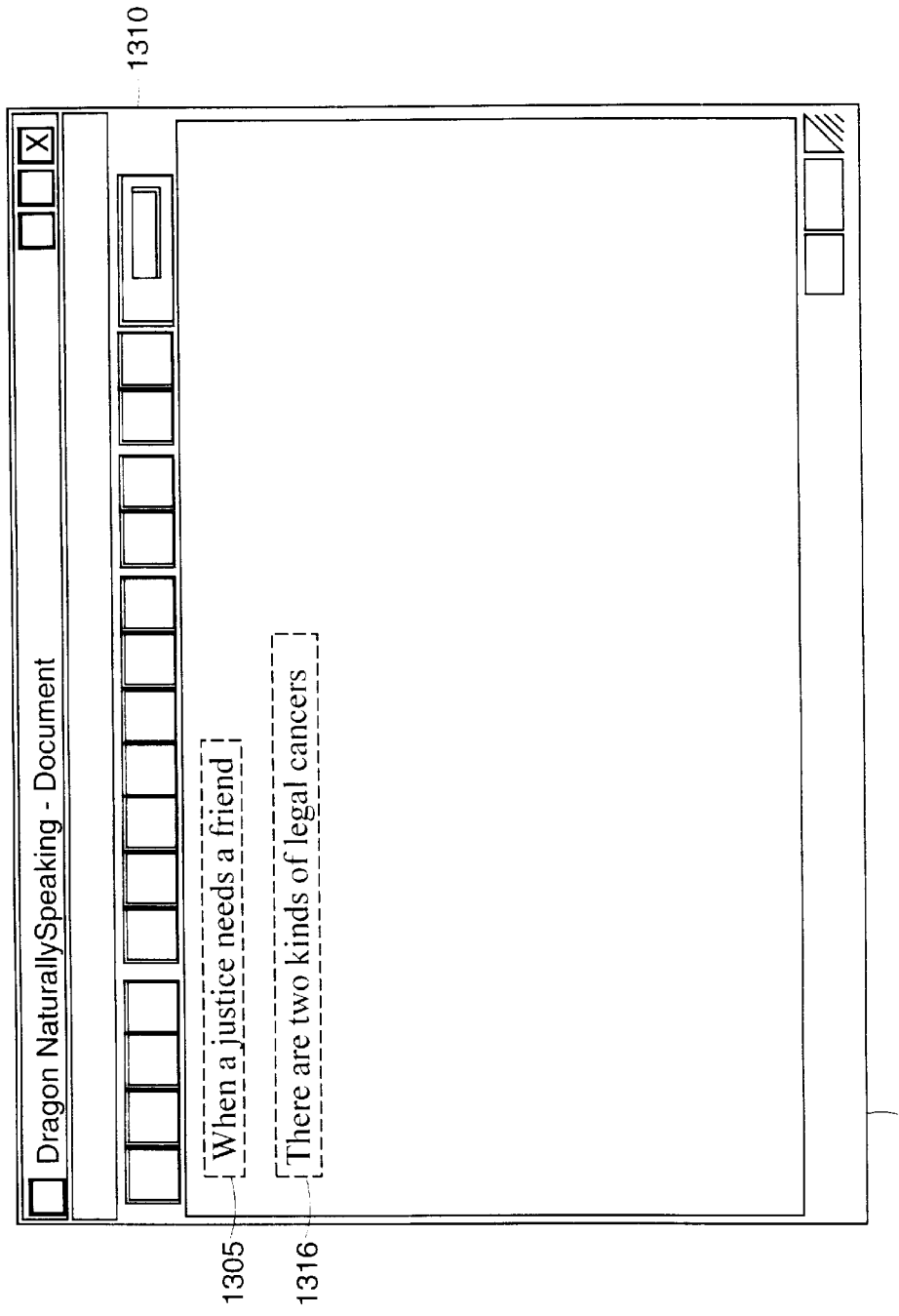
FIGS. 13A–13N are screen displays of a user interface of the speech recognition system of FIG. 1.

When the system makes a recognition error, the user may invoke an appropriate correction command to remedy the error. FIGS. 13A–13N illustrate a user interface provided by the control/interface module 220 in response to a sequence of interspersed text and commands. As shown in FIG. 13A, the recognizer 215 correctly recognizes a first utterance 1300 ("When a justice needs a friend New-Paragraph") and the control/interface module 220 displays the results 1305 ("When a justice needs a friend") of recognizing the utterance in a dictation window 1310. The module 220 displays text 1305 ("When a justice needs a friend") corresponding to a text portion of the utterance and implements the formatting command ("New-Paragraph") included in the utterance.

The recognizer 215 incorrectly recognizes a second utterance 1315 ("there are two kinds of legal kibitzers") by incorrectly recognizing the word "kibitzers" as "cancers". The control/interface module 220 displays this incorrect result 1316 ("There are two kinds of legal cancers") in the dictation window 1310. The control/interface module also displays the results of recognizing the current utterance, which, in this case, is the second utterance, in a display field 1320 at the bottom of the window 1310.

Figure 13B:
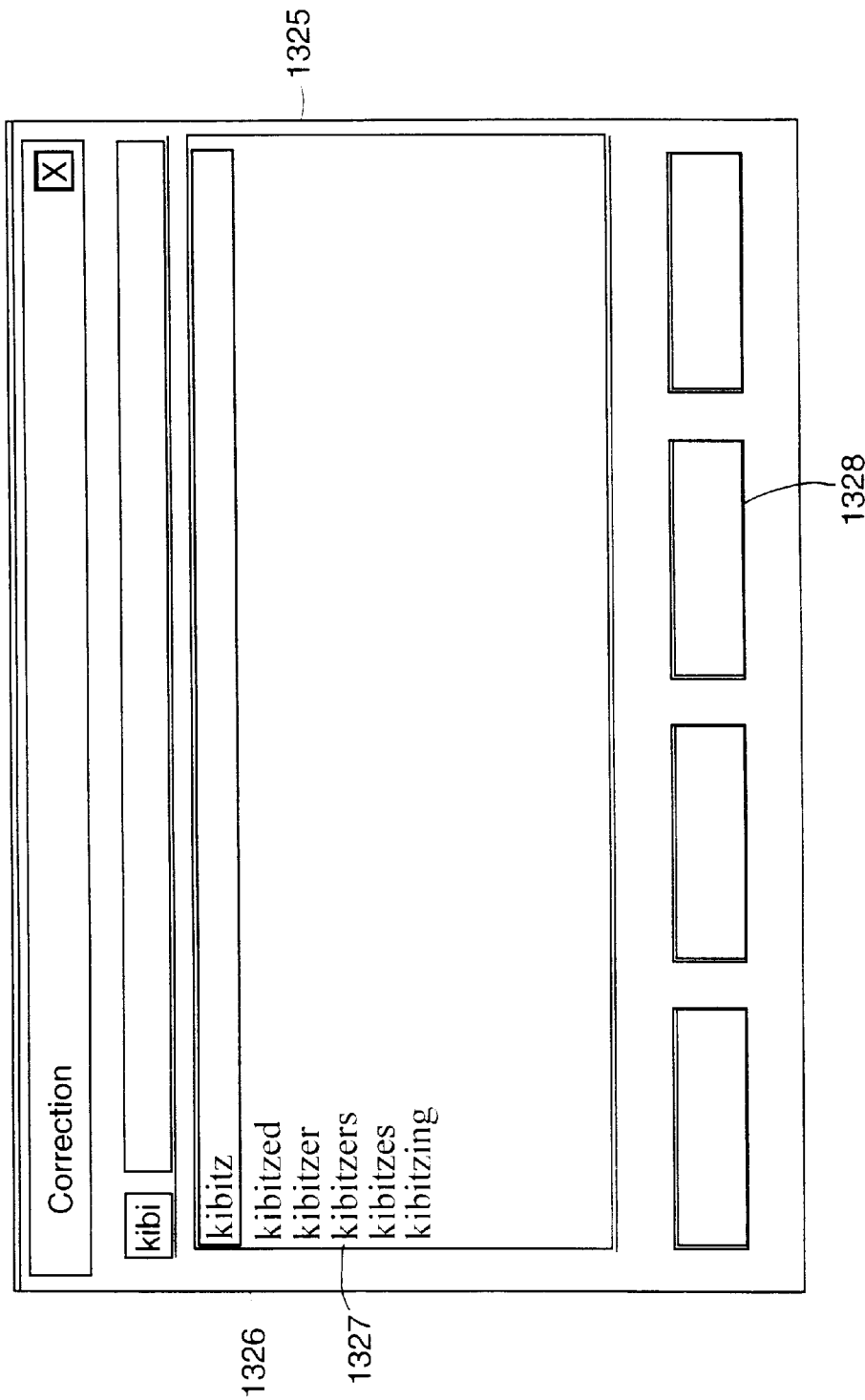

As shown in FIG. 13B, the user corrects the incorrect recognition by selecting the word "cancers" using the mouse 110 and saying "Spell That k i b i". The control/interface module responds to recognition of the "Spell That" command by displaying a correction dialog box 1325, such as is illustrated in FIG. 13B. The box 1325 displays a numbered list of words 1326 starting with the indicated letters ("kibi").

Instead of using the mouse 110 to select the word "cancer", the user could have verbally selected the word using a "Select" command by saying "Select cancer". Similarly, instead of saying "Spell That k i b i", the user could have typed the letters "k i b i".

Figure 13C:
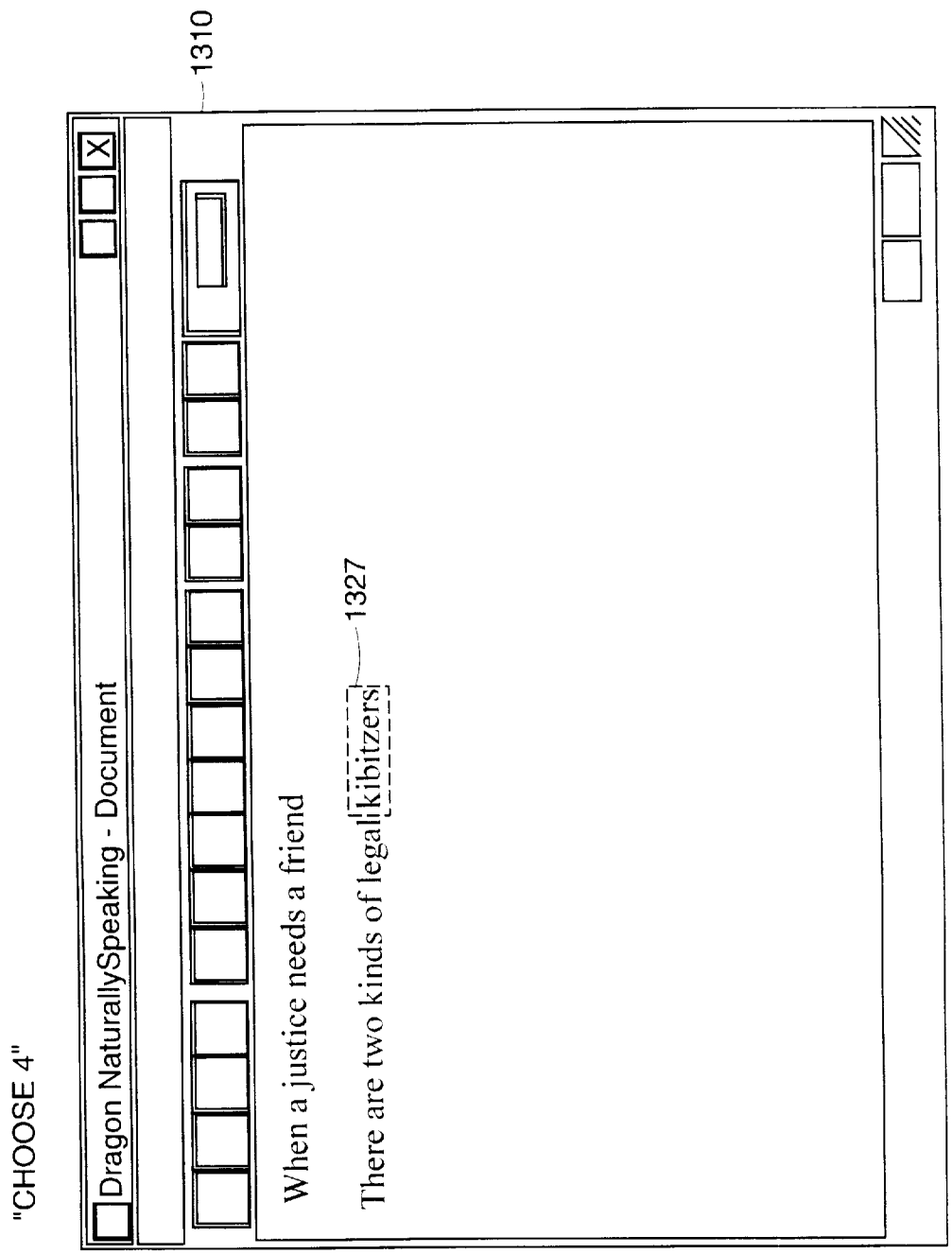

The user selects the correct word 1327 ("kibitzers") by saying "Choose 4 ", where "kibitzers" is the fourth word on the choice list. As shown in FIG. 13C, the control/interface module 220 responds by replacing the incorrect word ("cancers") with the selected word 1327 in the dictation window 1310.

Referring again to FIG. 13B, the correction dialog box 1325 includes a "Train" button 1328. When the user selects this button, the control/interface module responds by prompting the user through a training session to obtain one or more samples from the user of the word or words to be trained. The recognizer uses these samples to adapt acoustic models for the words to the user's speech patterns.

Figure 13D:
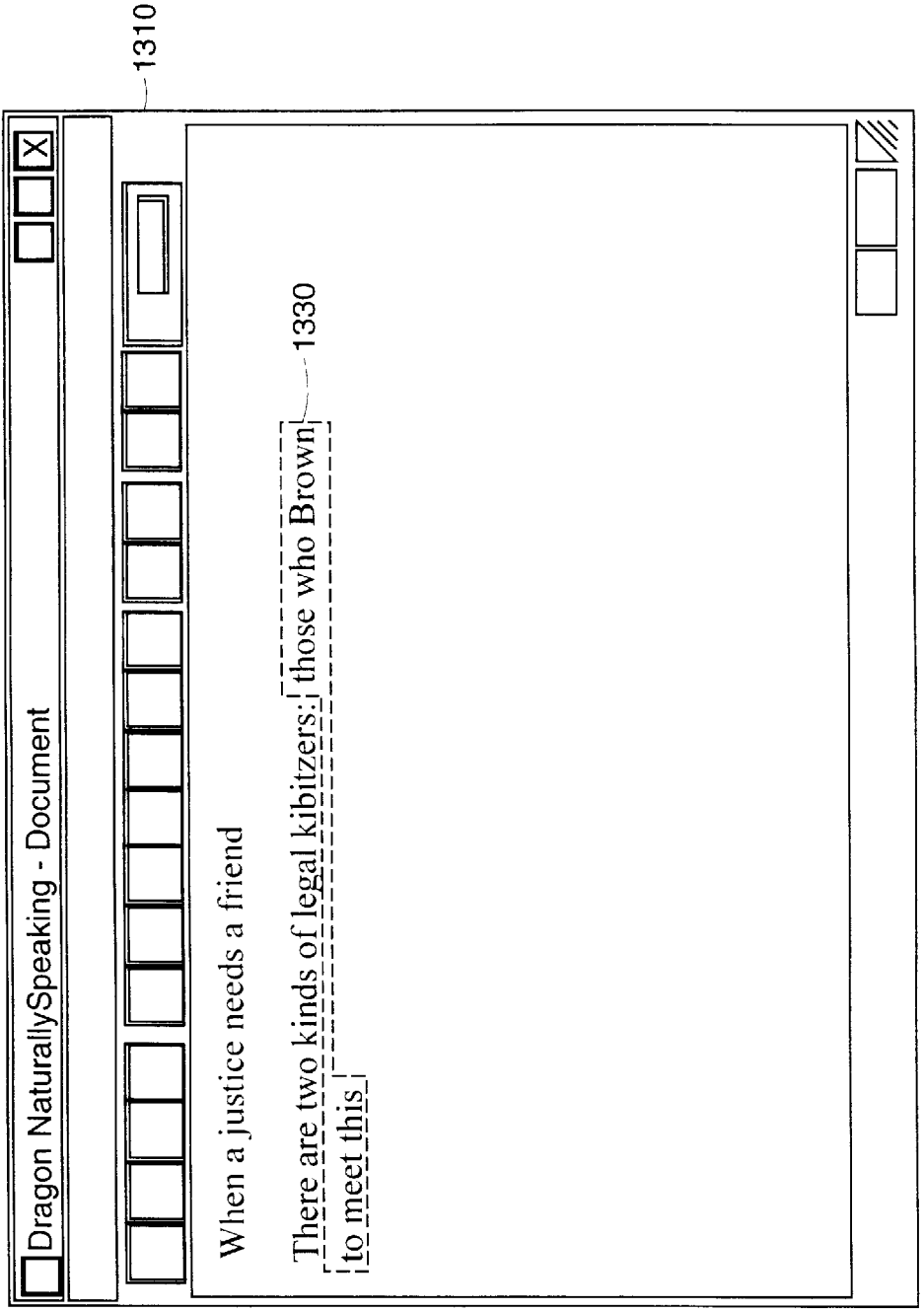
Figure 13E:
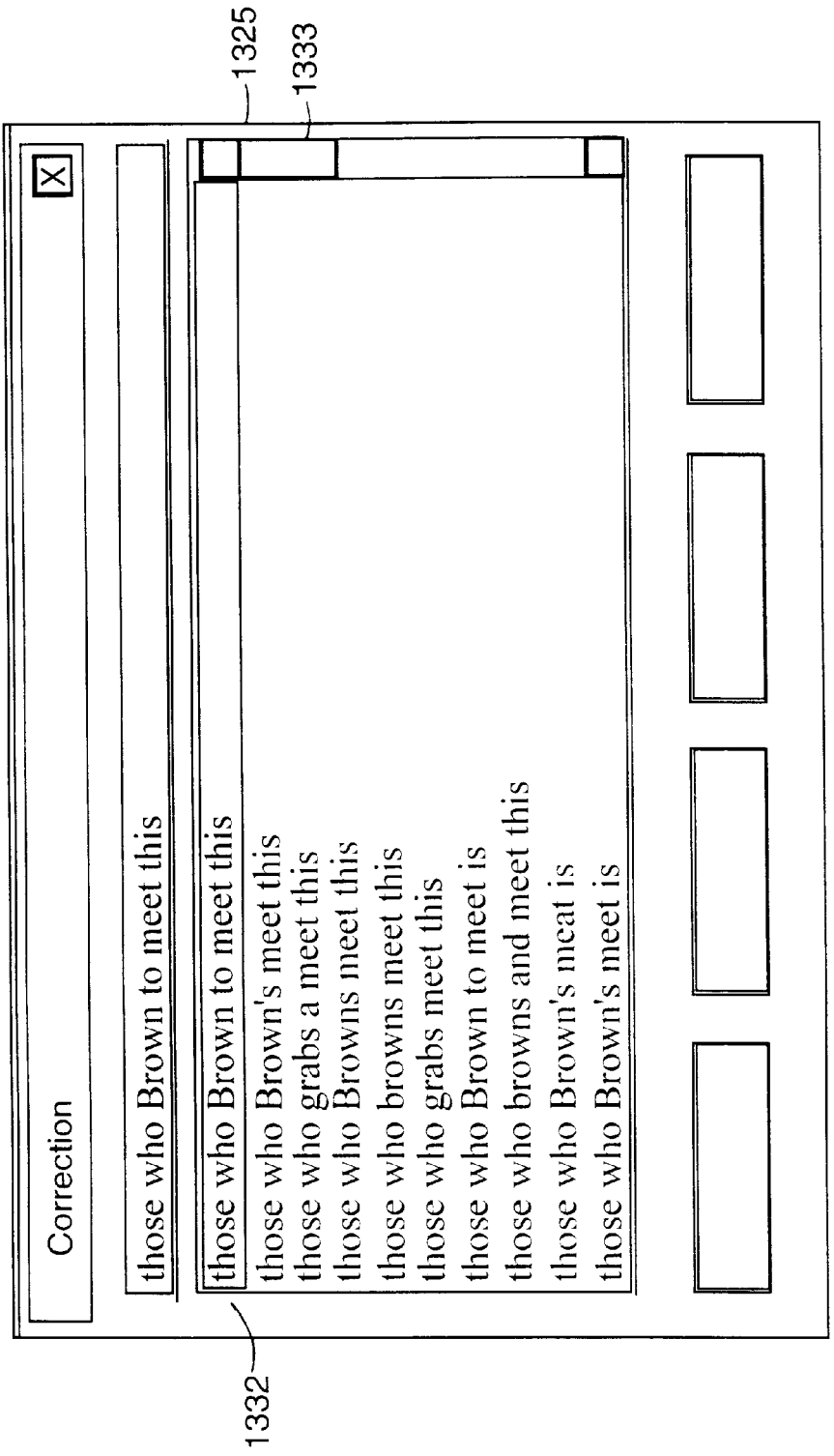

As shown in FIG. 13D, the recognizer 215 next misrecognizes a third utterance 1329 ("those who pronounce amicus") and the control/interface module 220 responds by inserting the incorrect text 1330 ("those who Brown to meet this") in the dictation window 1310. As shown in FIG. 13E, the user causes the control/interface module 220 to generate the correction dialog box 1325 by saying the "Correct That" command 1331. The correction dialog box 1325 includes a list 1332 of recognition candidates for the entire utterance 1329. Though the dialog box 1325 permits only ten recognition candidates to be displayed at a single time, the list 1332 may include more than ten entries. Additional entries may be accessed using a scroll bar 1333.

Figure 13G:
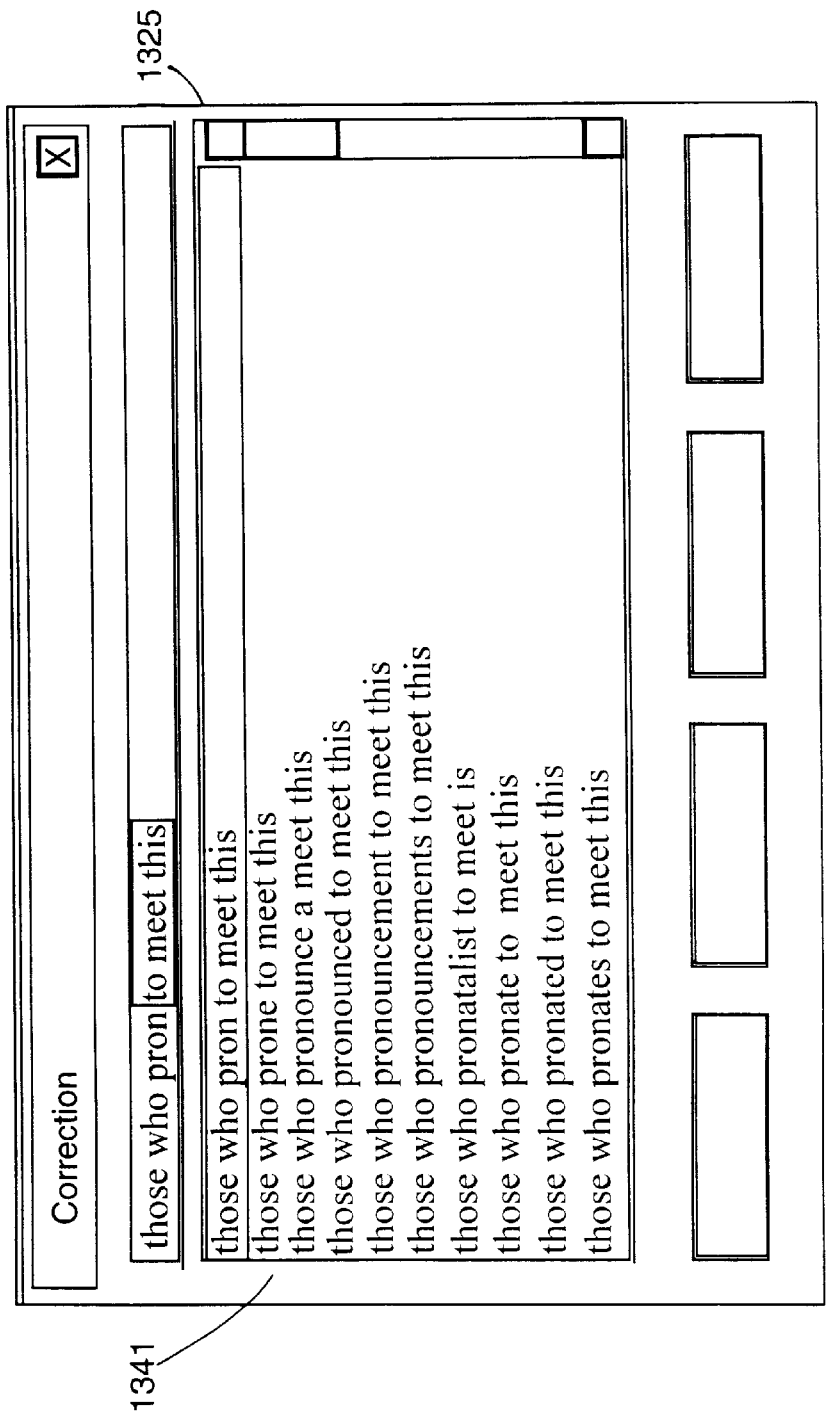

As shown in FIG. 13F, the user selects the word "Brown" 1335 using the mouse 110. As noted above, the user could also select the word "Brown" by using the voice command "Select Brown". As shown in FIG. 13G, the user then says "p r o n" 1340 to indicate that the word Brown should be replaced with a word starting with the letters "pron". The user could achieve the same result by typing the letters "pron".

The control/interface module 220 responds by producing an updated list 1341 of recognition candidates, where each recognition candidate includes a word starting with "pron" in the position previously occupied by the word "Brown". Each of the recognition candidates includes the correctly-recognized words that preceded "Brown" ("those who") and the words that followed "Brown" ("to meet this").

Figure 13H:
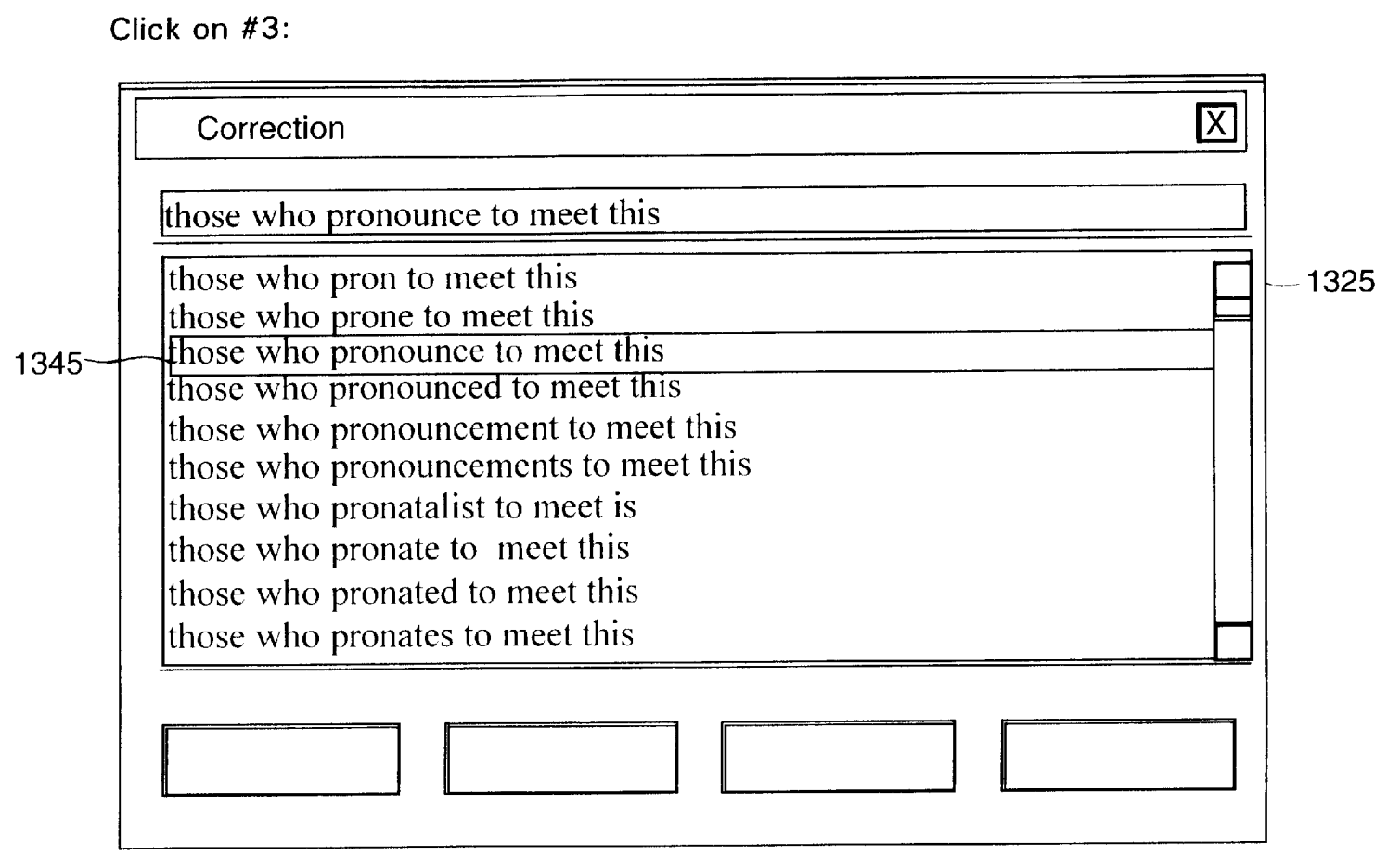

As shown in FIG. 13H, the user selects the recognition candidate 1345 that includes the word "pronounce" by using the mouse to select the third entry in the list. The user could achieve the same result by saying "Choose 3".

Figure 13I:
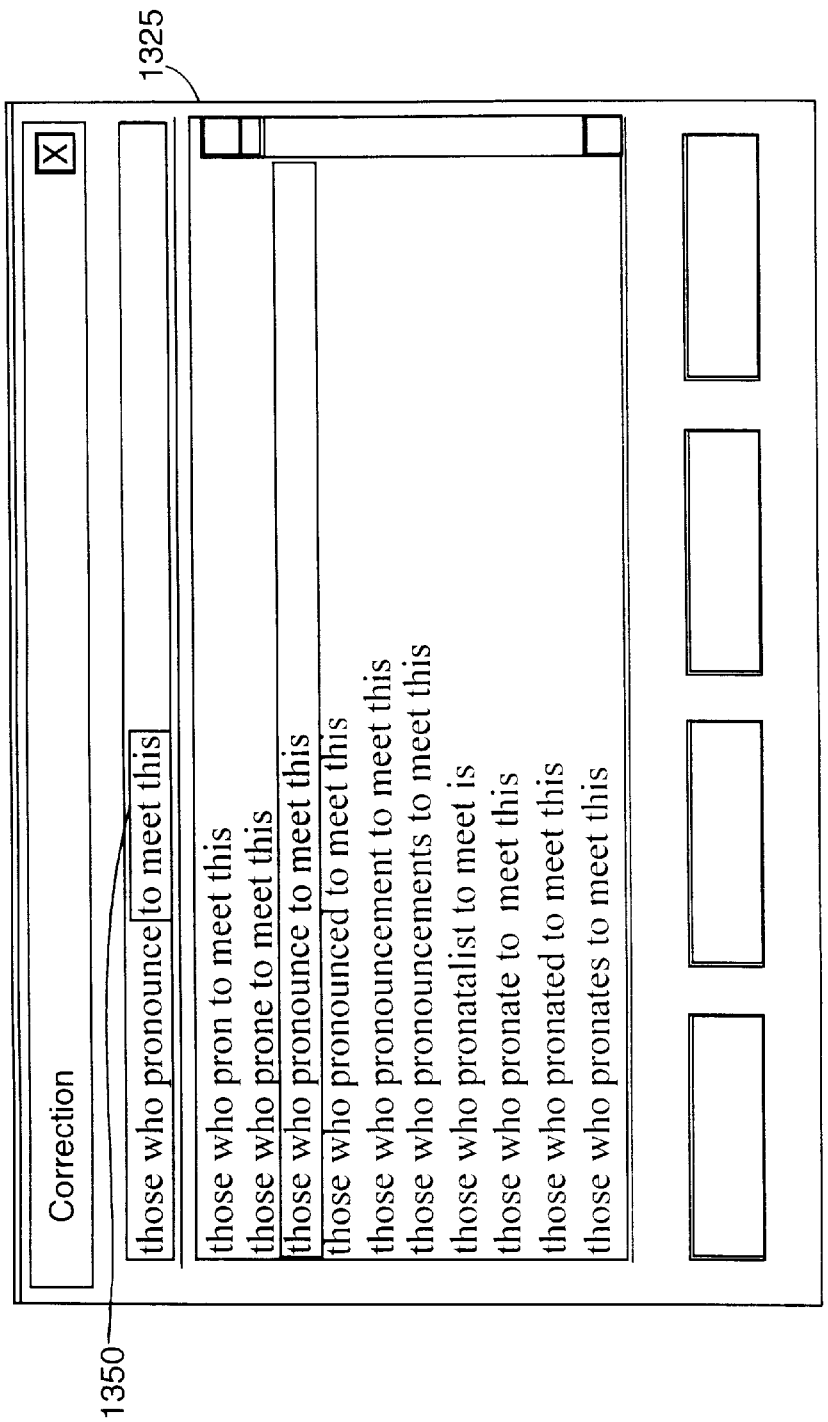
Figure 13J:
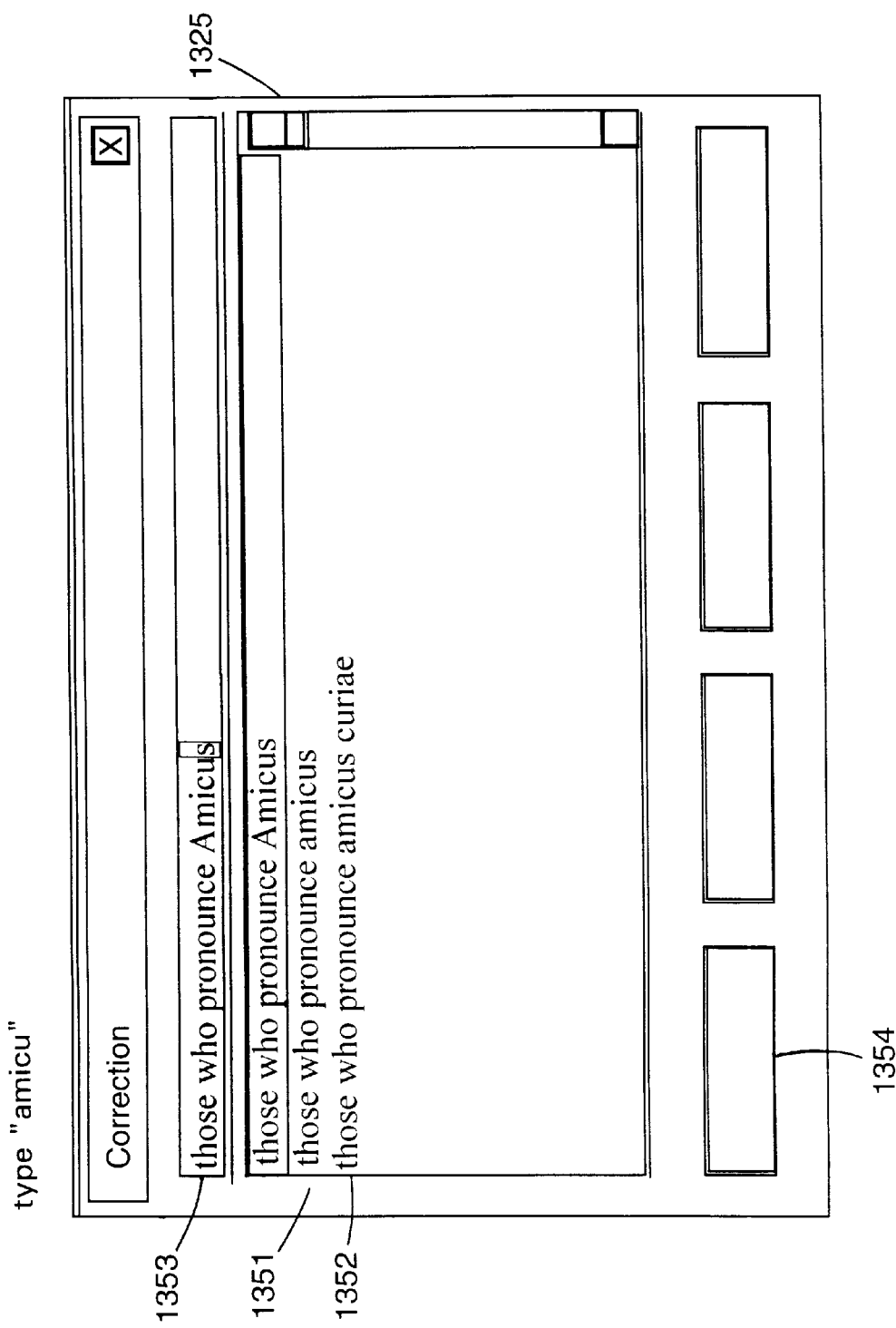
Figure 13K:
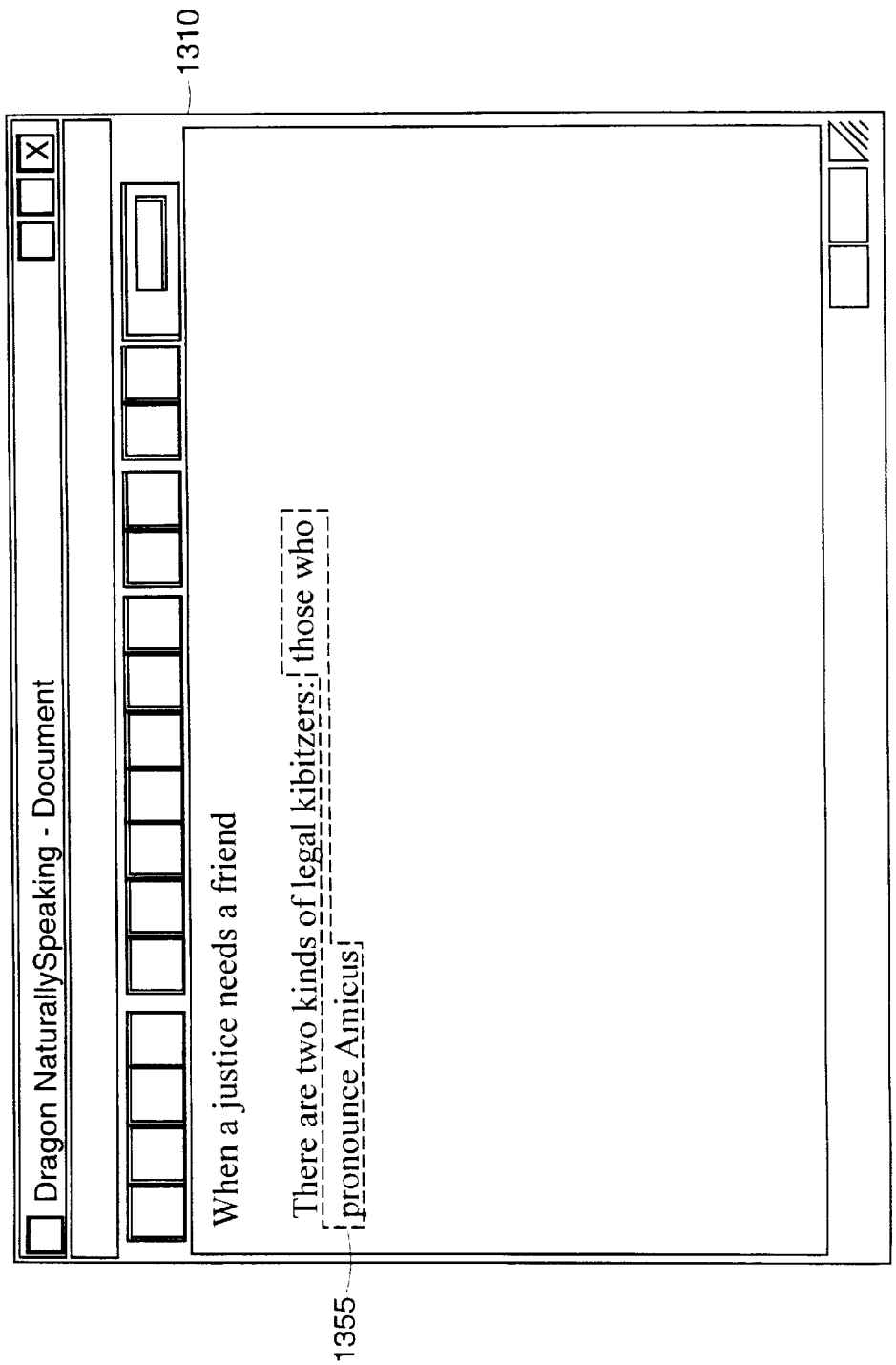

As shown in FIG. 13I, the user then uses the mouse to select the words "to meet this" 1350. Then, as shown in FIG. 13J, the user types the letters "amicu", and the control/interface module 220 responds by producing an updated list 1351 of recognition candidates that start with the words "those who pronounce" and include a word starting with the letters "amicu". An entry 1352 of the list includes a phrase "amicus curiae" that starts with the letters "amicu". Since the first entry 1353 is the correct entry, the user clicks on an "OK" button 1354 at the bottom of the correction dialog box 1325. As shown in FIG. 13K, the control/interface module 220 responds by placing the correct version 1355 of the utterance in the dictation window 1310. As discussed above, all of the correction steps for the utterance are performed within the same correction dialog box 1325.

Figure 13L:
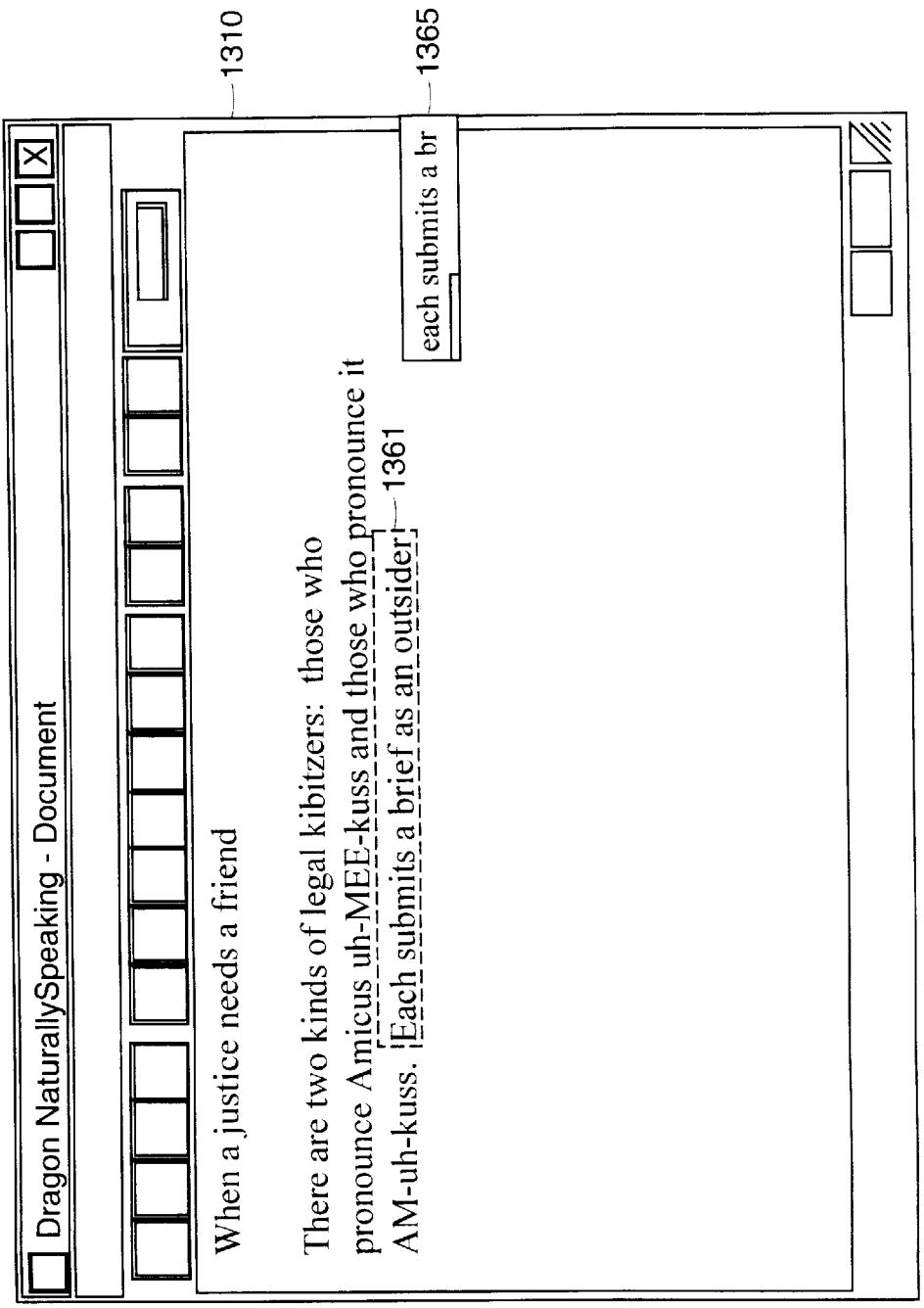
Figure 13M:
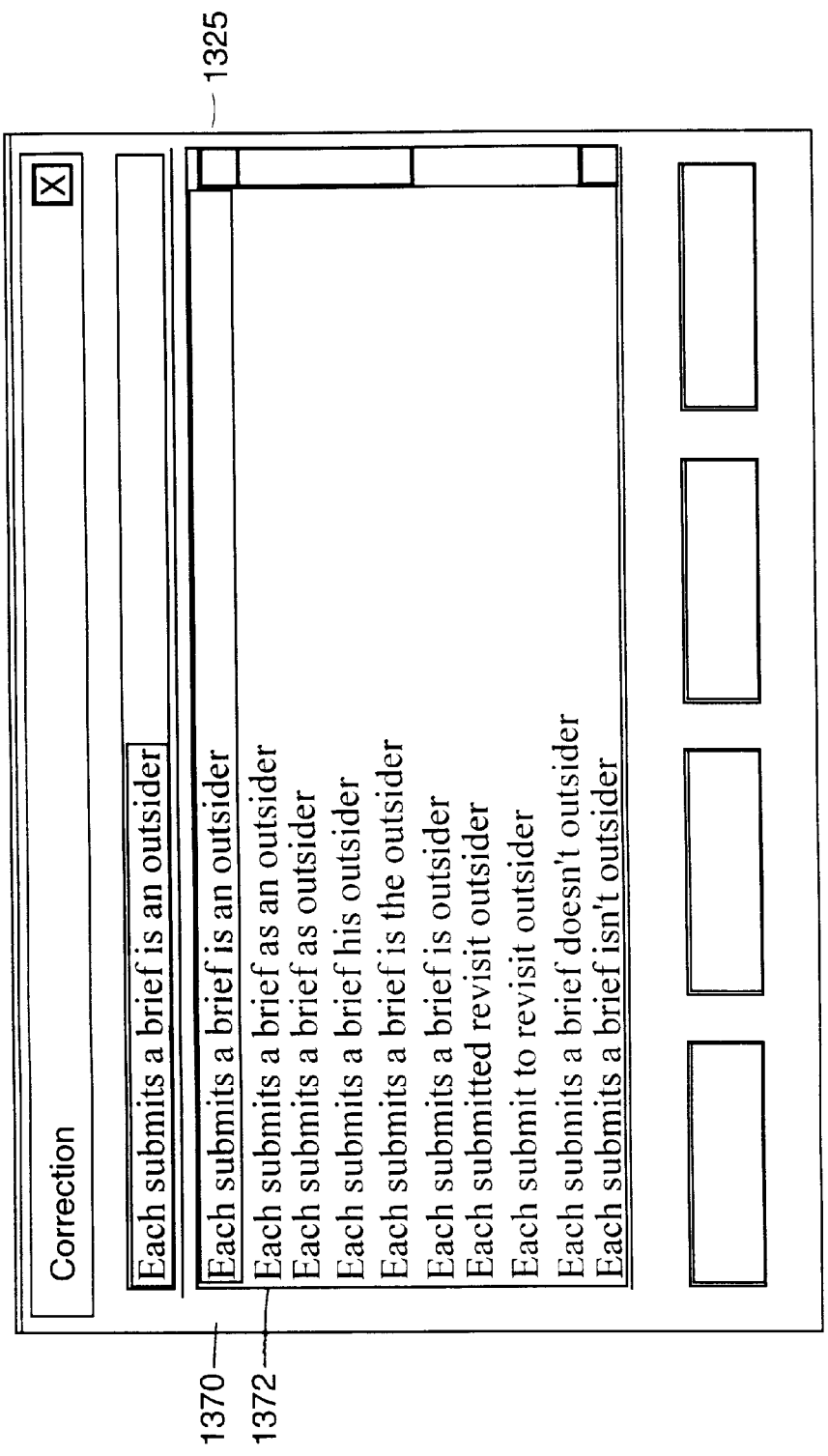
Figure 13N:
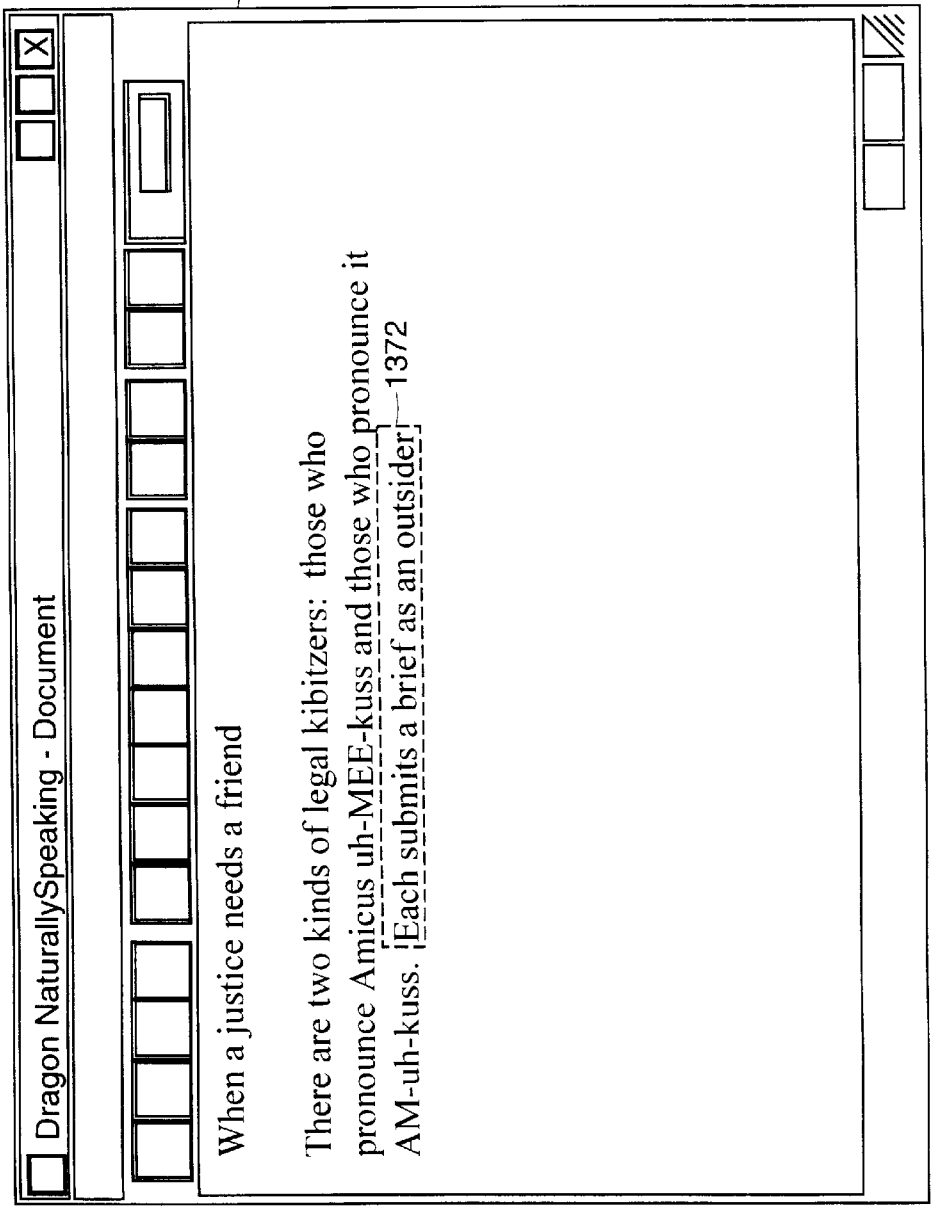

As shown in FIG. 13L, the recognizer 215 next misrecognizes an utterance 1360 ("Each submits a brief as an outsider") and the control/interlace module 220 responds by inserting the incorrect text 1361 ("Each submits a brief is an outsider") in the dictation window 1310. FIG. 13L also illustrates another feature of the interface. As an utterance is being recognized, the control/interface module 220 may display a partial recognition candidate 1365 for the utterance. This partial candidate represents the best scoring hypotheses for the utterance at a point in time before the recognizer completes processing of the utterance. Display of the partial candidate is useful for long utterances that may require an extended time for processing. As shown in FIG. 13M, the user again causes the control/interface module 220 to generate the correction dialog box 1325 by saying the "Correct That" command 1331. The correction dialog box 1325 includes a list 1370 of recognition candidates for the entire utterance 1331. Since the text of the utterance 1360 appears as the second entry 1372 on the list 1370, the user selects the text by saying "Choose 2". As shown in FIG. 13N, the control/interface module 220 responds by placing the text 1372 in the dialog box 1310.

Figure 14:
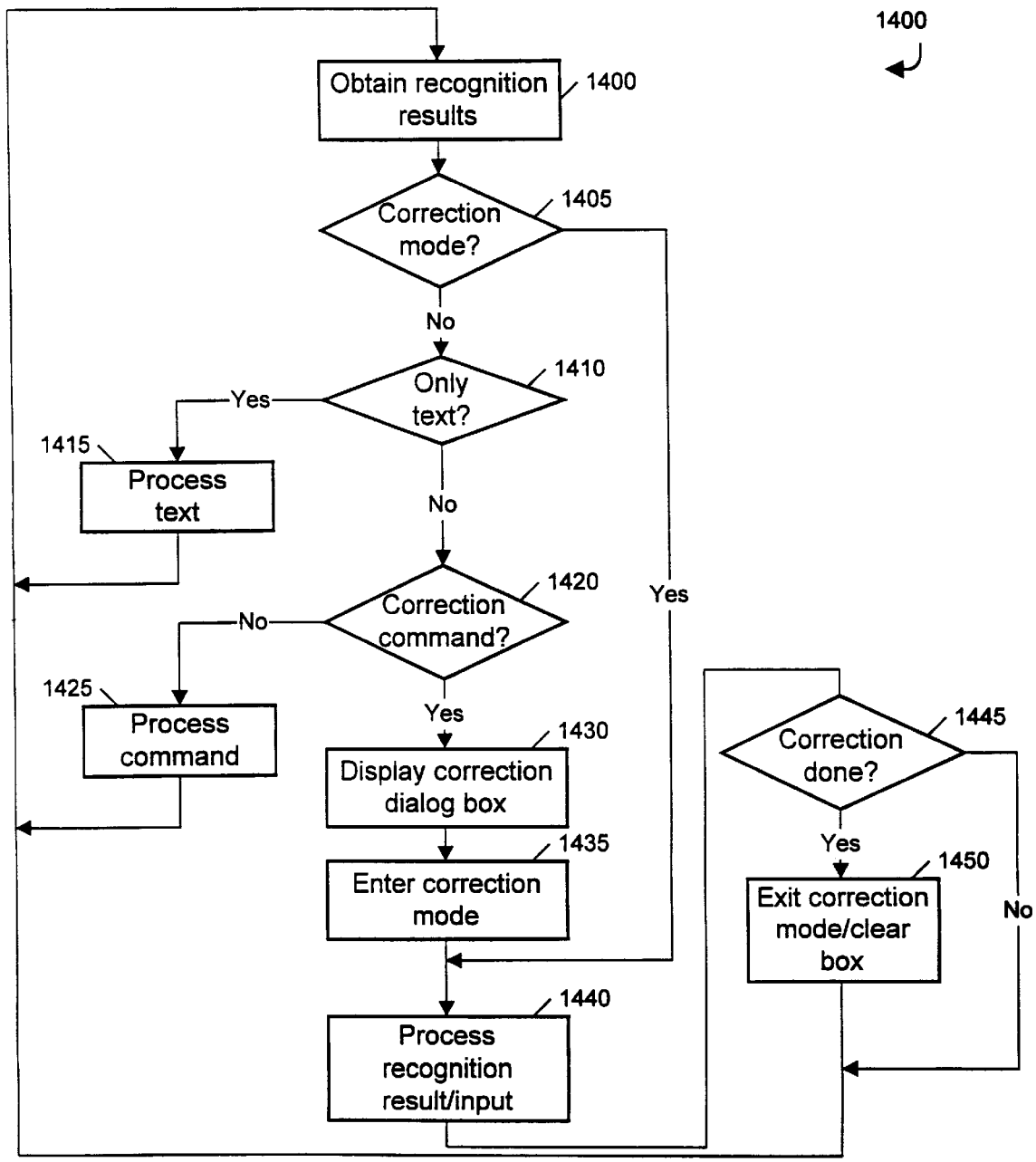

Referring to FIG. 14, the control/interface module 220 may process recognition results according to a procedure 1400. Initially, the control/interface module 220 receives recognition results for an utterance from the recognizer 215 (step 1405). If the speech recognition software is not operating in correction mode (i.e., the correction dialog box 1325 is not displayed) (step 1405), the control/interface module determines whether the best-scoring recognition candidate includes only text (step 1410). If so, the control/interface module processes the text (step 1415). For example, the control/interface module may insert the text into a dictation window 1310.

If the best-scoring recognition candidate includes something other than text (step 1410), the control/interface module determines whether the candidate includes a correction command (step 1420). Correction commands activate the correction dialog box 1325 and include the "Spell That" and "Correct That" commands noted above, and an additional correction command, referred to as the "Make That" command.

If the best-scoring recognition candidate does not include a correction command (step 1420), the control/interface module processes any other command included in the best-scoring recognition candidate (step 1425). For example, as shown in FIG. 13A, if the best-scoring recognition candidate includes text and a formatting command such as New-Paragraph, then the control/interface module processes the text portion of the candidate and performs the formatting command.

If the best-scoring recognition candidate includes a correction command (step 1420), then the control/interface module displays the correction dialog box 1325 (step 1430) and enters the correction mode (step 1435).

Next, the control/interface module processes the best-scoring recognition candidate as a correction command (step 1440). The control/interface module also processes the best-scoring recognition candidate as a correction command if the software already is operating in the correction mode when the recognition results are received (i.e., the correction dialog box is already displayed).

In general, the control/interface module responds to correction commands by displaying a choice list in the correction dialog box 1325. For the "Correct That" command, if no portion of the best-scoring recognition candidate has been selected previously using the mouse 110, keyboard 115, or the "Select" command, the choice list includes the recognition candidates provided by the recognizer 215, with the candidates being ordered according to their associated scores. If a portion of the best-scoring recognition candidate has been selected previously, then the choice list includes versions of the original recognition candidate in which the selected portion varies. These versions of the original candidate may be generated by having the recognizer 215 perform a re-recognition of the utterance using a constraint grammar that only permits the selected portion of the original candidate to vary from the original candidate.

Similarly, for the "Spell That" command, if no portion of the original candidate has been selected previously, then the choice list includes only entries that begin with the letters following "Spell That" in the "Spell That" command. If a portion of the original candidate has been selected previously, then the choice list includes versions of the original candidate in which the selected portion starts with the letters provided in the "Spell That" command.

The "Make That" command includes the words "Make That" followed by one or more replacement words. If no portion of the original candidate has been selected previously, then the choice list includes entries corresponding to recognition of the replacement words, so that the entire original candidate is replaced with the replacement words. Alternatively, the software could identify automatically a portion of the original candidate to be replaced with the replacement words and list recognition candidates that include different versions of that portion. If a portion of the original candidate has been selected previously, then the choice list includes versions of the original candidate in which the selected portion has been replaced with different recognition candidates for the replacement words.

After processing the best-scoring recognition candidate (step 1440), the control/interface module determines whether the command included in the candidate has completed the correction session (step 1445). If so, the control/interface module exits the correction mode and removes the correction dialog box (step 1450). In either case, the control/interface module then waits for receipt of the next set of recognition candidates (step 1400). The control/interface module also waits for such receipt after processing a text-only candidate (step 1415) or a candidate that includes no correction commands (step 1425).

As noted above, the user may choose either to speak a correct word or words using the "Make That" command or to verbally spell a correct word or portion of a word using the "Spell That" command. When the user invokes the "Make That" command, the recognizer 215 performs speech recognition on the utterance that includes the command and returns the results in the form of a list of ordered groups of phonemes (i.e., recognition candidates). For example, the recognition candidate for "Make That Apple" could include the phonemes corresponding to "Make That a pull" while the second recognition candidate could include the phonemes corresponding to "Make That apple".

The control/interface module 220 may expand on the list of recognition candidates provided by the recognizer 215 by finding "confused pronunciation" matches for the phonemes following "Make That" in each of the recognition candidates. Confused pronunciation is based on the observation that phonemes having similar characteristics are commonly confused with one another. The control/interface module 220 then creates a list of words corresponding to the confused pronunciation results and uses those words to populate the choice list in the correction dialog box 1325.

The software 160 also may be configured so that the "Make That" and "Spell That" commands do not use a correction dialog box. When the software is so configured, the control/interface module replaces an utterance, a selected portion of the utterance, or an automatically determined portion of the utterance with the text portion of the best-scoring result of the "Make That" or "Spell That" commands. The control/interface module may perform the replacement by instructing the recognizer 215 to perform a re-recognition of the utterance using a constraint grammar that requires the results of the re-recognition to include an entry from the list.

When the user invokes the "Spell That" command, the recognizer 215 recognizes the spelling of the word in the context of a spelling constraint grammar that permits recognition of only letters. The recognition candidates provided by the recognizer 215 are in the form of a list of ordered groups of letter, with each group being a probable recognition result for the word or portion of a word spelled by the user. The control/interface module may then find "confused spelling" matches for the groups of letters in the list of results. The confused spelling match is similar to the confused pronunciation match, and is based on the observation that letters having similar pronunciation are often confused with one another. The results of the confused spelling match are then used in the same manner as the results of the confused pronunciation match to correct previously-misrecognized text.

Generally, the system performs the confused pronunciation or confused spelling matches by searching a dictionary. If the word used to correct the previously misrecognized word is absent from the active vocabulary, then the recognizer 215 could not have avoided misrecognizing the word during the original recognition. To avoid repetition of the misrecognition, the control/interface module "activates" the word from the backup dictionary by adding the word to the active vocabulary 230.

Figure 15:
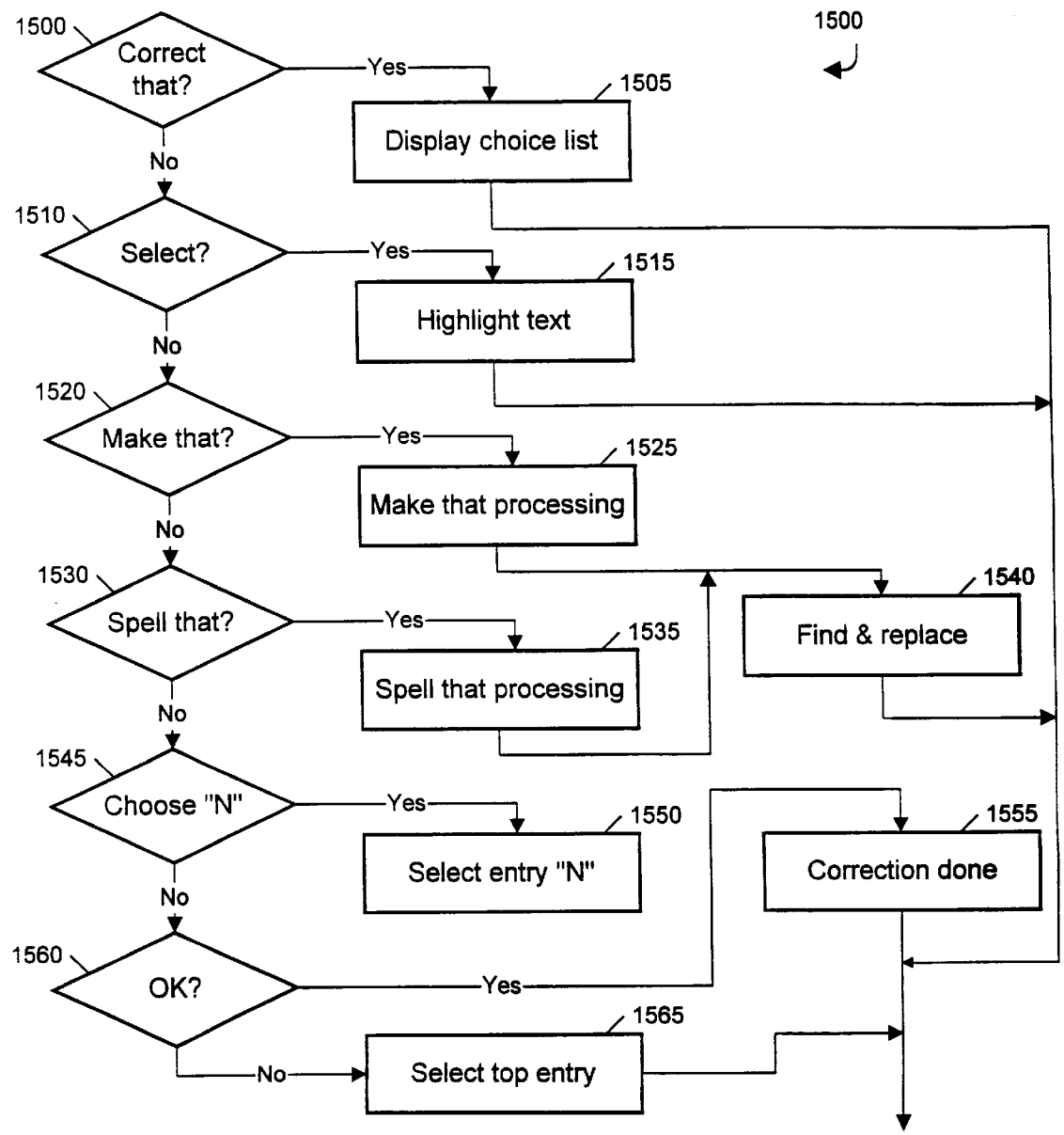

Referring to FIG. 15, the control/interface module 220 implements correction commands according to a procedure 1440. If the command corresponds to the "Correct That" command (step 1500), then the control/interface module displays a choice list as described above (step 1505).

If the command does not correspond to the "Correct That" command (step 1500), and instead corresponds to the "Select" command (step 1510), then the control/interface module finds and highlights the word or words in the text that follow the word "Select" in the select command (step 1515). These words are identified by the recognizer 215 through implementation of the constraint grammar corresponding to the "Select" command, as discussed above. Selecting a portion of previously-recognized results is discussed further in U.S. patent application Ser. No. 08/556,280, filed Nov. 13, 1995 and entitled "CONTINUOUS SPEECH RECOGNITION", which is incorporated by reference. The results of the "Select" command also may be achieved by using the mouse 110 or keyboard 115 to select a desired portion of the utterance.

If the command does not correspond to the "Correct That" command (step 1500) or the "Select" command (step 1510), the control/interface module determines whether the command corresponds to the "Make That" command (step 1520). The recognizer 215 identifies the "Make That" command using a constraint grammar similar to the constraint grammar for the "Select" command. In particular, the constraint grammar requires the words "make that" to be followed by one or more words from the recognition vocabulary. This constraint grammar may be expressed as:

<recognition result>::=Make That <phonemes>,
where

<phonemes>::=<phonemes><phoneme>
and

<phoneme> is any valid phoneme.
If the user has invoked the "Make That" command (step 1520), the control/interface module performs a MAKETHAT correction procedure (step 1525).

If the command does not correspond to the "Correct That" command (step 1500), the "Select" command (step 1510), or the "Make That" command (step 1520), the control/interface module determines whether the command corresponds to the "Spell That" command (step 1530). The recognizer 215 identifies the "Spell That" command using the following constraint grammar:

```
<recognition result>::=Spell That <letters>,
```
where
```
    <letters>::=<letters><letter>
```
and
```
    <letter> is any letter of the alphabet.
```
If the user has invoked the "Spell That" command (step 1530), the control/interface module performs the SPELLTHAT correction procedure (step 1535). From the dialog box, the user also may invoke the "Spell That" command by typing or speaking a series of letters.

Following performing one of the MAKETHAT (step 1525) or SPELLTHAT (step 1535) correction procedures, the control/interface module performs a procedure identified as FIND&REPLACE (step 1540). This procedure replaces some of the previously-recognized text with text produced by the MAKETHAT or SPELLTHAT correction procedures. Briefly, if a portion of an utterance has been selected using the "Select" command or other means, the control/interface module 220 instructs the recognizer 215 to perform a re-recognition to replace the selected word or words. If no selection has been made, then the control/interface module either replaces the entire utterance with text produced by the MAKETHAT or SPELLTHAT correction procedures, or re-recognizes speech frames for the previously-recognized words to replace a word or words in the previous recognition results.

If the correction command is the "Choose N" command (step 1545), the control/interface module selects entry "N" from the list displayed in the correction dialog box 1325 (step 1550) and indicates that correction is done (step 1515). If the correction command is "OK" or some other affirmative response (step 1560), then the control/interface module selects the top entry in the correction dialog box 1325 (step 1565) and indicates that correction is done (step 1555).

Referring to FIG. 16, in performing the MAKETHAT procedure 1600 (step 1525 of FIG. 15), the control/interface module first obtains an "n-best" list for the speech following "Make That" in the command (step 1605). In general, when the user utters the "Make That" command, the recognition candidates from the recognizer 215 will include more than one version of the "Make That" command. The "n-best" list includes an entry for each version of the "Make That" command, with each entry being an ordered group of phonemes that represents the pronunciation of a possible recognition result (i.e., a word or phrase). A score associated with each (entry indicates the determined probability that the group of phonemes corresponds to the user's speech.

After obtaining the "n-best list", the control/interface module converts each group of phonemes to one or more words or phrases for display to the user or insertion into the text. The control/interface module does so by searching a confused pronunciation dictionary using the group of phonemes as a key (step 1610). Words in the confused pronunciation may be the same as those in the active vocabulary 230 or the backup dictionary 245. In one embodiment, the words in the confused pronunciation dictionary are coextensive with the backup dictionary. If the confused pronunciation dictionary contains words which are not present in the active vocabulary 230, the words may be activated (i.e., added to the active vocabulary) as a result of the correction procedure.

In general, any phoneme may be confused for another phoneme. However, the probability of confusion depends on the characteristics of the two phonemes and the characteristics of the speaker's pronunciation. A confused pronunciation dictionary is based on the realization that some phonemes are likely to be mistaken for each other. For example, the phoneme /m/ is commonly mistaken for /n/, and the phonemes /a/ and /ĕ/ are commonly mistaken for /e/.

A determination of which phonemes may be confused with which other phonemes and the probability of that confusion may be based on empirical data. Such empirical data may be produced, for example, by gathering a recognition system's rate of confusion of phonemes for a preselected population or by studying frequency characteristics of different phonemes. A speech recognition system also may gather this data for pronunciations by a single user as part of the system's continuous training.

TABLE 1

| Phonemes | /p/ | /d/ | /t/ | Other |
|---|---|---|---|---|
| /p/ | 70% | 10% | 15% | 5% |
| /d/ | 5% | 51% | 35% | 9% |
| /t/ | 8% | 30% | 53% | 9% |

Table 1 provides an example of confused pronunciation data for three phonemes. Each row of the table indicates the rate at which a spoken phoneme corresponding to the row is recognized as various different phonemes corresponding to different coloumns. For example, the information in the first row indicates that the phoneme /p/ is recognized as itself 70% of the time, as /d/ 10% of the time, as /t/ 15% of the time, and as other phonemes 5% of the time. Each column in turn contains the rates at which different spoken phonemes are recognized as a particular phoneme. Therefore, the first column indicates that a spoken /p/ is recognized as /p/ 70% of the time, a spoken /d/ is recognized as /p/ 5% of the time, and a spoken /t/ is recognized as /p/ 8% of the time.

This data may be reduced to a list or a matrix of phonemes which are confused with one another more often than other phonemes. For example, in Table 1, the rates of confusion of /d/ and /t/ with one another are higher than their rates of confusion with other phonemes. Accordingly, the columns for /d/ and /t/ may be combined to produce a confused pronunciation entry /d,t/, as shown in Table 2.

TABLE 2

| Phonemes | /p/ | /d,t/ | Other |
|---|---|---|---|
| /p/ | 70% | 25% | 5% |
| /d/ | 5% | 86% | 9% |
| /t/ | 8% | 83% | 9% |

This reduction process may continue until a suitably reduced list of phonemes is obtained. In a further step, the recognition error rate of the recognition software using a confused pronunciation dictionary based on the list of phonemes may be studied to determine the impact of different reductions on the error rate. Based on the results of this study, the confused pronunciation dictionary may be modified to reduce the error rate.

Each entry of the confused pronunciation dictionary includes an ordered group of phonemes and an associated list of words. The ordered group if phonemes may include individual phoneme elements that each represent a single phoneme and combined phoneme elements that represent two or more phonemes that are commonly confused for one another. The confused pronunciation dictionary also maintains information about the probabilities with which different phonemes of a combined phoneme are confused with one another. This information is used to rank the words from the associated list of words. For example, assume that a recognition candidate includes the phoneme /d/ and a combined phoneme element represents the phonemes /p/, /d/ and /t/. As noted above, the phoneme /t/ is more likely to be confused with the phoneme /d/ than is the phoneme /p/. Accordingly, with all other factors being equal, the control/interface module would rank a word that include the phoneme /t/ higher than a word that includes the phoneme /p/.

To find a confused pronunciation match for an ordered group of phonemes, the control/interface module converts the ordered group of phonemes to a confused pronunciation of the ordered group of phonemes and searches the confused pronunciation dictionary using the confused pronunciation of the ordered group of phonemes as a key. For example, the control/interface module might produce a confused pronunciation of the ordered group of phonemes by replacing all occurrences of the phonemes /d/, /p/, or /t/ with the combined phoneme element /d,p,t/.

Scores for confused pronunciation matches are generated using three sources of information: the probability that the sequence of phonemes for which the matches were sought ("the recognized sequence") was the actual sequence of phonemes produced by the speaker, the probability that a particular confused pronunciation ("the confused sequence") was confused for the recognized sequence, and the probability that the confused sequence occurs in the language (e.g., English) with which the system is used. These probabilities correspond to the scores produced by, respectively, the recognizer 215 for the recognized sequence, a dynamic programming match of the recognized phonemes and the dictionary pronunciation using a priori probabilities of phoneme confusion, and a unigram language model for the word corresponding to the dictionary pronunciation. When the scores are represented by negative logarithms, they may be combined using addition. Scores for confused spelling matches are produced using similar information.

As an alternative to using a confused pronunciation dictionary, a confused pronunciation searching technique may be used to find matches in a standard pronunciation dictionary. In a standard pronunciation dictionary, each entry includes a word and an ordered group of phonemes representing the pronunciation of the word. The confused pronunciation searching technique converts an ordered group of phonemes that is to be used to search the dictionary to a list of ordered groups of phonemes, with each entry in the list representing a likely confused pronunciation of the original ordered group of phonemes. The control/interface module then searches the pronunciation dictionary once for each entry in the list.

Figure 17:
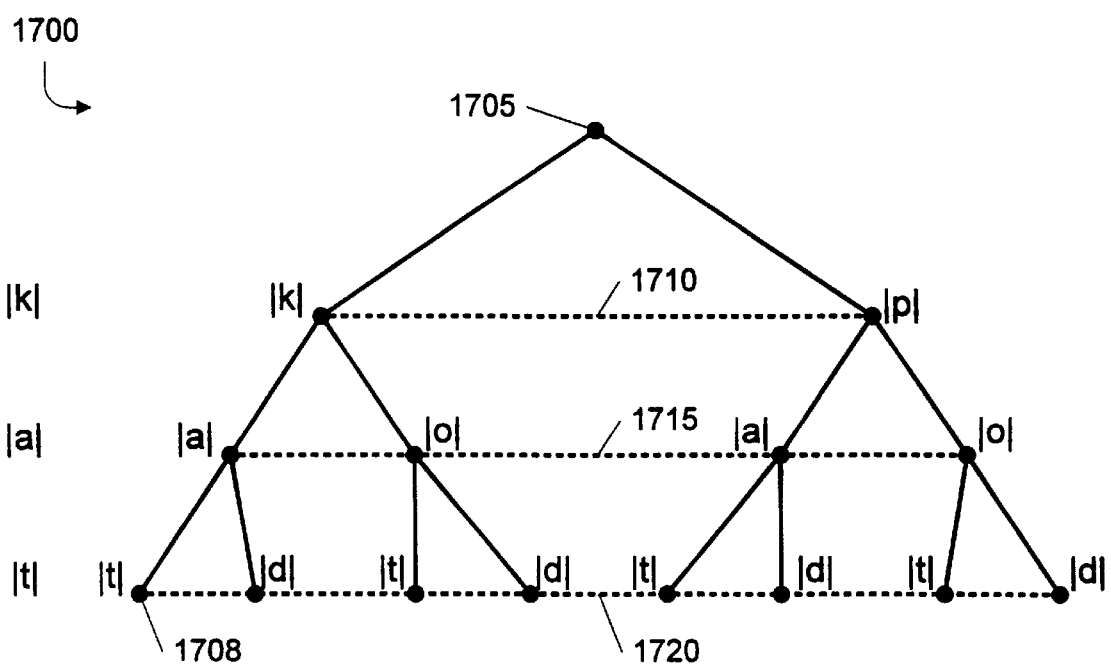
FIG. 17 is an example of a phonetic tree.

Referring to FIG. 17, confused pronunciation matches also may be found by using a phonetic tree 1700. Conceptually, this approach operates similarly to the pre-filtering procedure 240. However, instead of generating scores based on acoustic matching, as is done by the pre-filtering procedure 240, the phonetic tree 1700 is used to generate scores based on a priori probabilities of confusing phonemes.

The root node 1705 of the tree represents the beginning of a word. Each of the remaining nodes of the tree corresponds to a phoneme. In addition, each leaf node of the tree (e.g., node 708) corresponds to a word. Accordingly, the phonemes represented by the nodes along a path from the root node 1705 to a leaf node constitute the phonetic spelling of the word.

The tree in FIG. 17 corresponds to the group of phonemes /kat/. In the first level 1710, the nodes correspond to the phonemes /k/ and /p/, where /p/ may be confused with /k/. It should be noted that the tree has been simplified to permit only two confused phonemes at each level. In the second level, the nodes correspond to /a/ and /o/, where /o/ may be confused with /a/. The third level 1720, in turn, corresponds to the phoneme /t/ and /d/, where /d/ may be confused with /t/.

At each node, the control/interface module checks the phonetic spelling along the branch that includes the node against a pronunciation dictionary to determine whether the phonetic spelling represented by the node corresponds, at least in part, to a word. If not, the control/interface module deactivates the node to prevent further propagation of the node. If the phonetic spelling corresponds to a word, at least in part, the node remains active to proceed to the next level. This process is continued until the phonetic tree represents all potential confused pronunciations of a group of phonemes for which a match is sought ("the recognized sequence"). Branches that have an active node at the final level represent the phonetic spelling of the confused pronunciation matches for the group for which the match was sought. Branches with an inactive final node do not represent a confused pronunciation match. The phonetic spellings of the active branches are converted into their associated words. These words form the list of confused pronunciation matches to be used for correcting previously recognized text.

At each node the control/interface module also calculates the score for that node. The score for a node is calculated by determining the probabilities for three possible relationships between the phoneme represented by the node and the recognized sequence of phonemes. The first relationship is that of substitution (i.e., the probability that a phoneme of the recognized sequence has been substituted for the phoneme of the node). The second relationship is that of insertion (i.e., the probability that the phoneme of the node was inserted where the user did not say a corresponding phoneme). The third relationship is that of deletion (i.e., the probability that the phoneme of the node was said by the user but ignored).

At each node, the control/interface module creates a series of tokens, with each token containing the score for one of these relationships. A token includes a score S, an index i that corresponds to the phoneme position of the recognized sequence represented by the token, and a pointer to the node. Each node may have tokens corresponding to more than one value of the index i. Thus, the token for a node N at a phoneme position i may be:

$$<S, i, N>,$$

where N is a pointer to the node N.

A token at phoneme position i may transition in the three ways noted above. First, the substitution token is:

$$<S+L(p_{i+1}, p_N), i+1, N_c>,$$

where $P_{i+1}$ is the phoneme from the recognized sequence at position i+1, $P_N$ is the phoneme at node N, $L(p_{i+1}, p_N)$ is the likelihood of $p_N$ being recognized as $p_{i+1}$, and $N_c$ is a child node of node N. The insertion token is:

$$<S+L(p_{i+1}, \emptyset), i+1, N>,$$

where $L(p_{i+1}, \emptyset)$ is the likelihood of phoneme $p_{i+1}$ being inserted. Finally, the deletion token is:

$$<S+L(\emptyset, p_N), i, N_c>,$$

where $L(\emptyset, p_N)$ is the likelihood of phoneme $p_N$ being ignored. A substitution token and a deletion token may be generated for each child node of node N.

The control/interface module then passes the tokens to the child nodes. At each node, tokens having the same index value are compared and the one having the lowest score for each value of i is retained and used to generate tokens to pass to subsequent child nodes. The lowest-scoring token represents the best recognition score for a node and phoneme position.

An advantage of searching a pronunciation dictionary using a confused pronunciation search or a phonetic tree is that these methods use a dictionary which also may be used for other purposes. This eliminates any need to store a separate confused pronunciation dictionary in memory or on a storage device. In addition, it permits the confused pronunciations matrix to be adapted continually for a particular user's speech patterns. An advantage of using a confused pronunciation dictionary is that it requires less computing power to find confused matches in a time comparable to the time required by confused pronunciation search or lexical tree approaches.

Although the MAKETHAT correction procedure is described with reference to one word replacing a portion of the previously recognized results, the correction procedure also may be used with multiple words by modifying the constraint grammar for re-recognizing the utterance to include multiple-word entries from the list of search results.

Referring to FIG. 18, the SPELLTHAT procedure 180 operates similarly to the MAKETHAT procedure, with the exception that each entry in the n-best list is a group of letters corresponding to a word (i.e., a spelling of the word) rather than a pronunciation of the word. Thus, to correct a misrecognition of the word "unit" as "unix", the user could say "Make That unit" or "Spell That u, n, i, t". Accordingly, the control/interface module begins the SPELLTHAT procedure by retrieving an "n-best letter list" (step 1805). The control/interface module then performs a "confused spelling" match for each entry in the n-best letter list (step 1810). Similarly to the confused pronunciation match, the confused spelling match treats letters that are commonly confused for one another (e.g., "b" and "v") as a single combined letter. Based on the confused spelling match, the control/interface module creates a list of words, each of which has an assigned score corresponding to its likelihood of being the correct word. As in the MAKETHAT procedure, various techniques may be used to generate the confused spelling matches. In one embodiment, the spelling dictionary is coextensive with the backup dictionary. In other embodiments, the spelling dictionary may be coextensive with the active vocabulary.

Figure 19:
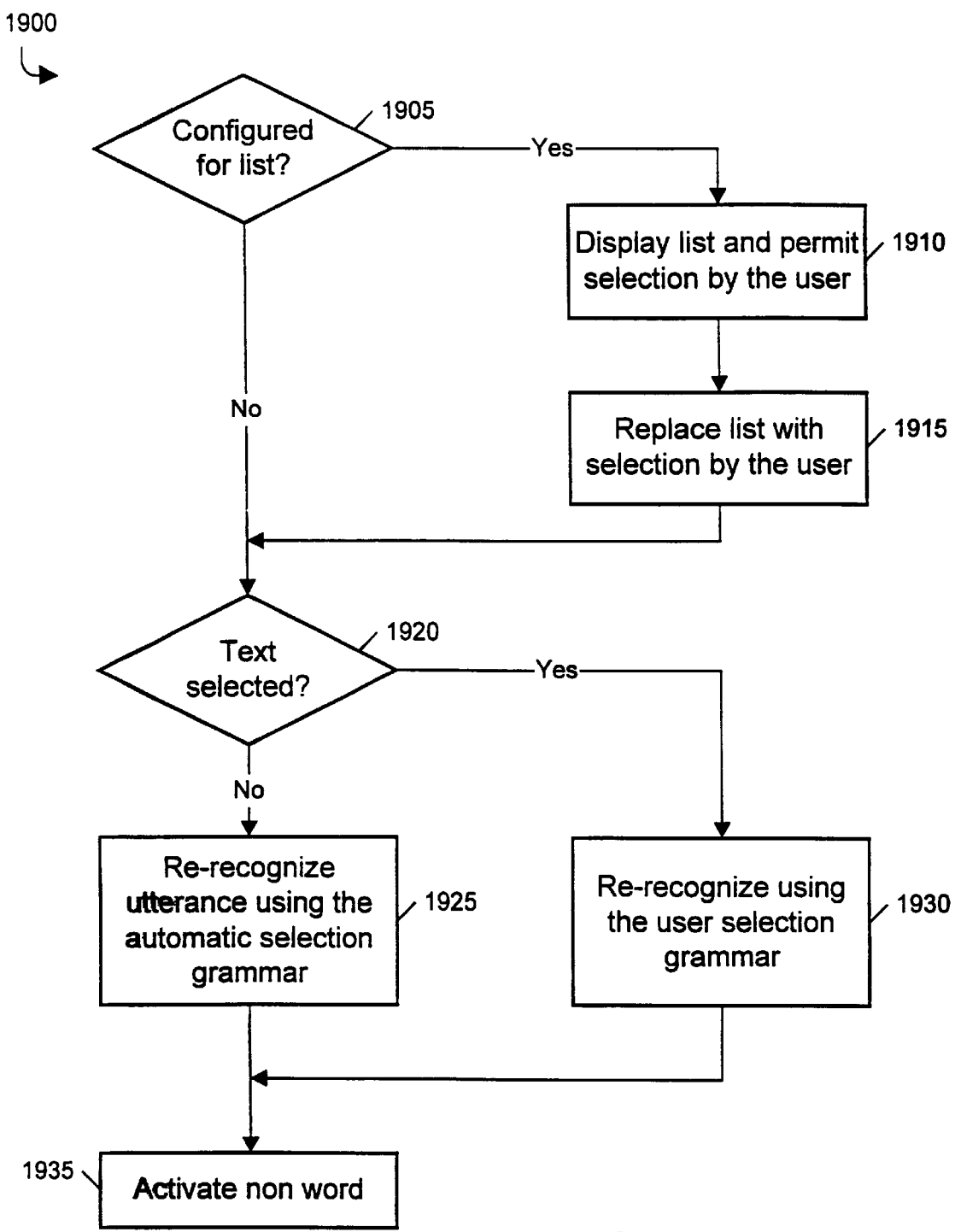

Referring to FIG. 19, the control/interface module executes the FIND&REPLACE procedure 1900 by first determining whether the software is configured to display the list of words from MAKETHAT or SPELLTHAT (step 1905) in a correction dialog box. If the software is so configured, the control/interface module displays the list from MAKETHAT or SPELLTHAT ordered in an ascending order by score and obtains a selection by the user from among the entries in the list through, for example, the "Choose N" command (step 1910). The control/interface module replaces the list from MAKETHAT or SPELLTHAT with the user's selection (step 1915) so that, as will be described in detail below, any re-recognition of an utterance using the list as a vocabulary does not process other words in the list when the user has already indicated the correct result.

If text has not been selected (step 1920), the control/interface module performs a constrained re-recognition of all utterances corresponding to the words currently displayed to the user (step 1925). The purpose of this re-recognition is to identify the text to be replaced with the results from MAKETHAT or SPELLTHAT. The constrained re-recognition is performed according to a constraint grammar that requires a portion of the previous recognition results beginning with the first word (including an empty portion), followed by an entry from the MAKETHAT/SPELLTHAT list, followed by one or more words from the n-best list of the original recognition of the utterance. This grammar may be represented by the following EBNF notation:

⟨recognition result⟩ ::=

⟨pre-words⟩ ⟨new-words⟩ [⟨aux-word⟩] ⟨post-words⟩ where

⟨pre-words⟩ ::= [PRW$^1$[PRW$^2$[ ... [PWR$^n$]]]],

PRW$^i$ is the ith previously recognized word,

⟨new-words⟩ ::= ⟨new-words$^1$⟩ |⟨new-words$^2$⟩| ... ,

⟨new-words$^i$⟩ is the ith sequence of words generated by

MAKETHAT or SPELLTHAT,

⟨aux-word⟩ is any word (or sequence of words) in the user's active vocabulary, and ⟨post-words⟩ ::= [[[[PWR$^1$]PWR$^2$] ... ]PWR$^n$].

Therefore, the control/interface module determines where in the recognition results for an utterance an entry from the MAKETHAT/SPELLTHAT list best fits. In cases where the user selected the replacement word from among the list (step 1910), the MAKETHAT/SPELLTHAT list will be limited to that selection. Therefore, the control/interface module will perform the constrained re-recognition faster than in the case where there is no selection.

If text has been selected (step 1920), the control/interface module performs a differently constrained re-recognition of the utterance (step 1930). The constrained re-recognition is performed according to a constraint grammar that requires words prior to the words selected by the user, followed by words from the MAKETHAT/SPELLTHAT list, followed by one or more words from the n-best list of the original recognition of the utterance. This constraint grammar may be represented as:

⟨recognition result⟩ ::=

⟨pre-words⟩ ⟨new-words⟩ [⟨aux-word⟩] ⟨post-words⟩, where

⟨pre-words⟩ ::= PRW$^1$PRW$^2$ ... PWR$^s$,

PRW$^1$ ... PWR$^s$ are the previously recognized words preceding the selection, if any ⟨new-words⟩ ::= ⟨new-words$^1$⟩ |⟨new-words$^2$⟩| ... , ⟨new-words$^i$⟩ is the ith sequence of words generated by MAKETHAT or SPELLTHAT, -continued ⟨aux-word⟩ is any word (or sequence of words) in the user's active vocabulary, ⟨post-words⟩ ::= [PWR$^{s+k+1}$[PWR$^{s+k+2}$[ ... [PWR$^n$]]], PRW$^{S+k+1}$ ... PRW$^n$ are the previously recognized words following the selection, if any, and k words are selected. The control/interface module re-recognizes the words following the word or words selected for replacement, since it is possible that replacement of those words affects the word boundaries between the words following the replacement and that the recognition results may be different. Therefore, in effect, the user's selection of a portion of the previously recognized text provides a starting point for re-recognition of the utterance. When the system is configured to obtain a selection among the words in the list from the user (step 1910), the MAKETHAT/SPELLTHAT list is limited to the user's selection.

Following performing the re-recognition (steps 1925, 1930), if the word used to replace the previous recognition results is missing from the active vocabulary 230, the control/interface module activates that word by adding it to the active vocabulary (step 1935).

Figure 20:
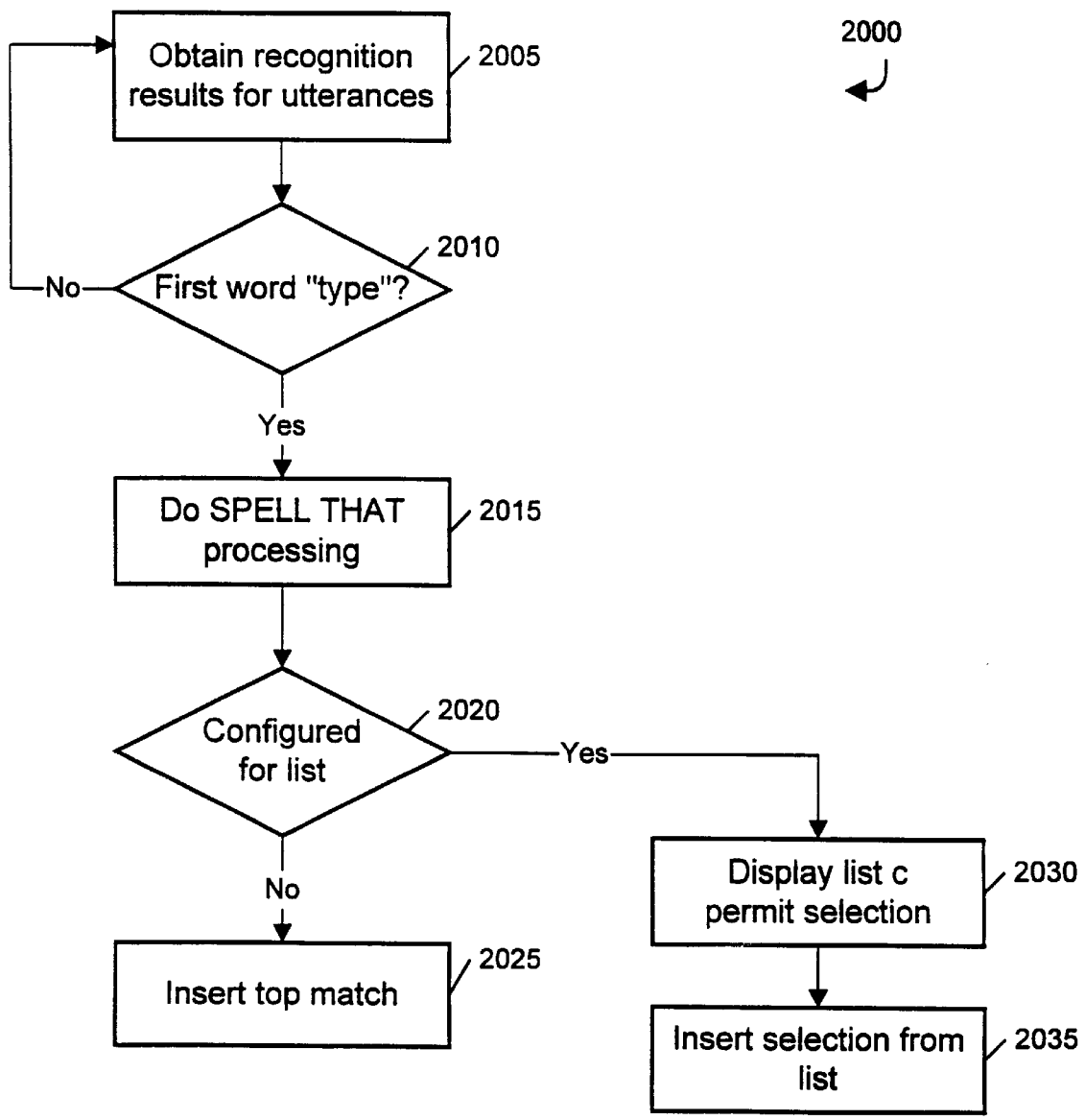

Referring to FIG. 20, in another embodiment, the control/interface module may implement a TYPE procedure 2000 in a manner similar to the SPELLTHAT procedure to permit a user to enter text without correcting previously-recognized text. Initially, the control/interface module obtains the recognition result for an utterance (step 2005) and determines whether the command "type" was invoked (step 2010). If so, the control/interface module performs SPELLTHAT processing (step 2015) to produce a list of words. Based on the configuration of the system (step 2020), the control/interface module automatically selects the most probable recognition result (step 2025) or displays the list to the user (step 2030) and inserts the choice selected by the user (step 2035).

Other embodiments are within the scope of the following claims. For example, the command word may follow the speech corresponding to the text to be corrected.

In the embodiments of MAKETHAT and SPELLTHAT described above, the word entries in the pronunciation and spelling dictionaries are coextensive with those of the backup dictionary. Therefore, the MAKETHAT procedure is able to correct misrecognitions which could not have been avoided because the word was not in the active vocabulary. In an alternative embodiment, instead of using such a large dictionary, the active vocabulary or a dictionary coextensive with the active dictionary may be used for generating the n-best list. This speeds up the error correction procedures. Other embodiments may use the lexical tree pre-filtering technique noted above to further speed up the process by limiting the searching only to those words which are generated by the lexical tree pre-filtering technique.

In another alternative embodiment, instead of performing confused pronunciation and confused spelling searches, other types of searches including simple pronunciation or spelling searches are performed.

In alternative embodiments, other constraint grammars may be used. For example, in the FIND&REPLACE procedure, if the user has selected a portion of the text, the following grammar may be used:

<Recognition result>::=<words><selected word><auxiliary word>, where <words> are previously-recognized words preceding the selected word <auxiliary word>::=W$^1$|W$^2$|W$^3$.. W$^n$, and , W$^i$ is a word from the n-best list of the original recognition of the utterance.

When the user has not selected a portion of the text, the following grammar may be used:

<Recognition result>::=<word><word'><auxiliary word>,

<word>::=[PRW$^1$[PRW$^2$[PRW$^3$ ... PRW$^n$]]], where

PRW is a previously recognized word,

<word'>::=LW$^1$|LW$^2$|LW$^3$ ... LW$^n$,

LW is a word from MAKETHAT/SPELLTHAT list,

<auxiliary word>::=W$^1$|W$^2$|W$^3$ ... W$^n$, and

W$^i$ is a word from the n-best list of the original recognition of the utterance.

In addition, the techniques described here are not limited to any particular hardware or software configuration; they may find applicability in any computing or processing environment that may be used for speech recognition. The techniques may be implemented in hardware or software, or a combination of the two. Preferably, the techniques are implemented in computer programs executing on programmable computers that each include a processor, a storage medium readable by the processor (including volatile and non-volatile memory and/or storage elements), at least one input device, and at least one output device. Program code is applied to data entered using the input device to perform the functions described and to generates output information. The output information is applied to one or more output devices.

Each program is preferably implemented in a high level procedural or object oriented programming language to communicate with a computer system. However, the programs can be implemented in assembly or machine language, if desired. In any case, the language may be a compiled or interpreted language.

Each such computer program is preferably stored on a storage medium or device (e.g., CD-ROM, hard disk or magnetic diskette) that is readable by a general or special purpose programmable computer for configuring and operating the computer when the storage medium or device is read by the computer to perform the procedures described in this document. The system may also be considered to be implemented as a computer-readable storage medium, configured with a computer program, where the storage medium so configured causes a computer to operate in a specific and predefined manner.

What is claimed is:

1. A method of correcting incorrect text associated with recognition errors in computer-implemented speech recognition, comprising:

performing speech recognition on an utterance to produce a recognition result for the utterance;

identifying a correction command in the recognition result for the utterance; and identifying corrected text from a portion of the recognition result for the utterance, wherein the correction command indicates that the portion of the recognition result comprises a pronunciation of a word to be corrected.

2. The method of claim 1, further comprising replacing previously-generated incorrect text with the corrected text.

3. The method of claim 2, further comprising automatically selecting the previously-generated incorrect text to be replaced.

4. The method of claim 3 wherein the step of automatically selecting comprising re-recognizing previously-recognized speech corresponding to the previously-generated incorrect text using the corrected text.

5. The method of claim 1, wherein the step of identifying corrected text includes searching a dictionary using the portion of the recognition result.

6. The method of claim 1, wherein the step of identifying corrected text comprises identifying corrected text from a portion of the recognition result for the utterance and from a recognition result for a second utterance.

7. The method of claim 6, wherein the second utterance precedes the utterance.

8. The method of claim 6, wherein the second utterance follows the utterance.

9. The method of claim 1, wherein the step of identifying corrected text comprises using confused pronunciation matching, in which commonly-confused sounds are treated as a single sound, to identify text corresponding to the pronunciation.

10. The method of claim 9, wherein the confused pronunciation matching comprises using the pronunciation to search a confused pronunciation dictionary.

11. The method of claim 9, wherein the confused pronunciation matching comprises using the pronunciation to search a pronunciation dictionary for confused pronunciation matches.

12. The method of claim 9, wherein the confused pronunciation matching comprises using a phonetic tree to search a pronunciation dictionary.

13. The method of claim 9, further comprising generating a list of confused pronunciation matches and identifying the corrected text as a selection from the list of confused pronunciation matches.

14. The method of claim 13, further comprising using the list of confused pronunciation matches to re-recognize previously-recognized speech so as to determine the corrected text.

15. The method of claim 13, further comprising displaying text corresponding to the list of confused pronunciation matches to a user and obtaining the selection from the user.

16. The method of claim 1, the method further comprises:

using an active vocabulary when performing speech recognition, using a backup dictionary when identifying the corrected text, and if the active vocabulary does not contain the corrected text, adding the corrected text to the active vocabulary.

17. A method for recognizing a spelling of a word in computer-implemented speech recognition, comprising:

performing speech recognition on an utterance to produce recognition results;

identifying a spelling command in the recognition results, wherein the spelling command indicates that a portion of the utterance comprises a spelling;

producing the spelling by searching a dictionary using the recognition results, wherein producing the spelling comprises using confused spelling matching, in which commonly-confused letters are treated as a single letter, to identify the spelling corresponding to the portion of the utterance.

18. The method of claim 17, wherein the dictionary is a confused spelling dictionary and the confused spelling matching comprises using the spelling to search the confused spelling dictionary.

19. The method of claim 17, wherein the dictionary is a spelling dictionary and the confused spelling matching comprises using the spelling to search the spelling dictionary for confused spelling matches.

20. The method of claim 17, further comprising generating a list of confused spelling matches and identifying the text corresponding to the spelling as a selection from the list of confused spelling matches.

21. The method of claim 20, further comprising displaying the list of confused spelling matches to a user and obtaining the selection from the user.

22. The method of claim 17, wherein confused spelling matching comprises using characteristics of a speaker's pronunciation to search the dictionary for confused spelling matches.

* * * * *

(12) EX PARTE REEXAMINATION CERTIFICATE (6798th)
United States Patent
Young et al.

(10) Number: US 6,064,959 C1
(45) Certificate Issued: May 5, 2009

(54) ERROR CORRECTION FOR SPEECH RECOGNITION

(75) Inventors: Jonathan Hood Young, Newtonville, MA (US); David Wilsberg Parmenter, Newton, MA (US); Robert Roth, Newtonville, MA (US); Joev Dubach, Watertown, MA (US); Gregory J. Gadbois, Amesbury, MA (US); Stijn Van Even, Jamaica Plain, MA (US)

(73) Assignee: USB AG, Stamford Branch, Stamford, CT (US)

Reexamination Request:
No. 90/008,538, Mar. 14, 2007

Reexamination Certificate for:
Patent No.: 6,064,959
Issued: May 16, 2000
Appl. No.: 08/825,534
Filed: Mar. 28, 1997

(51) Int. Cl.
*G10L 15/22* (2006.01)
*G10L 15/00* (2006.01)
*G10L 15/06* (2006.01)

(52) U.S. Cl. ............. 704/251; 704/275; 704/E15.008; 704/E15.04

(58) Field of Classification Search ............... None
See application file for complete search history.

(56) References Cited

PUBLICATIONS

Kurzweil Applied Intelligence, Kurzweil Voice Works v. 1.4 User Manual, 1997.*

* cited by examiner

*Primary Examiner*—Sharon E Payne

(57) ABSTRACT

Incorrect text associated with recognition errors in computer-implemented speech recognition is corrected by performing speech recognition on an utterance to produce a recognition result for the utterance. When a correction command is identified in the recognition result for the utterance, corrected text is produced from a portion of the recognition result for the utterance.

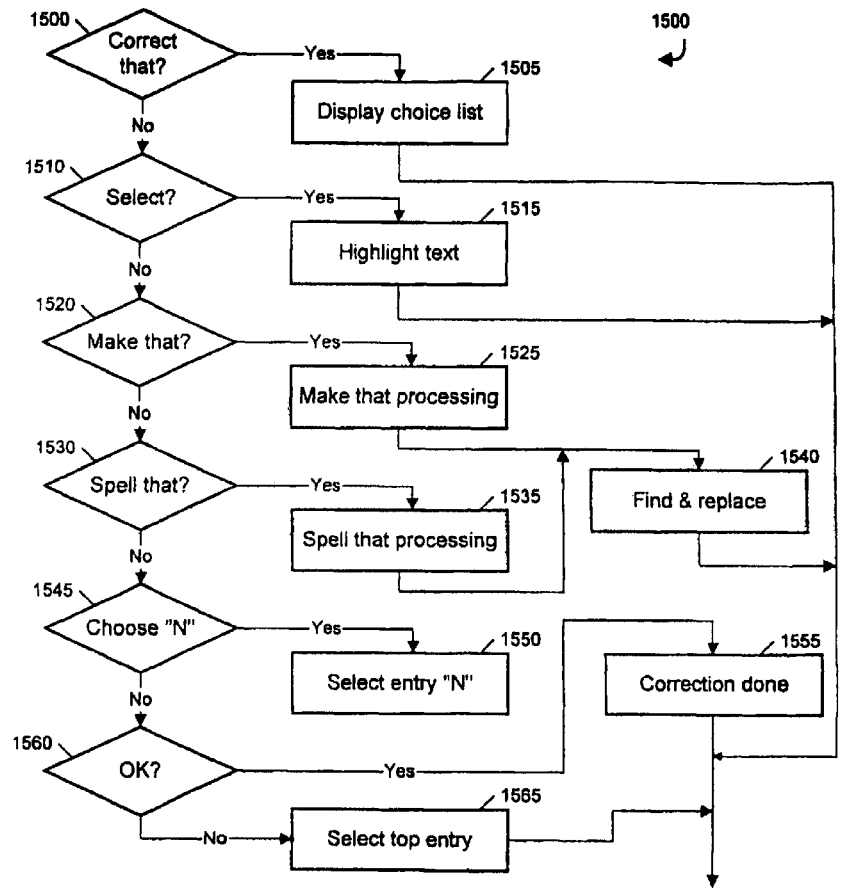

EX PARTE REEXAMINATION CERTIFICATE ISSUED UNDER 35 U.S.C. 307

NO AMENDMENTS HAVE BEEN MADE TO THE PATENT

AS A RESULT OF REEXAMINATION, IT HAS BEEN DETERMINED THAT:

The patentability of claims 1, 2 and 3 is confirmed.

Claims 4–22 were not reexamined.

* * * * *